United States Patent
Numata et al.

(10) Patent No.: US 11,644,991 B2
(45) Date of Patent: May 9, 2023

(54) STORAGE DEVICE AND CONTROL METHOD

(71) Applicant: Kioxia Corporation, Tokyo (JP)

(72) Inventors: Makiko Numata, Kamakura (JP); Mitsunori Tadokoro, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 84 days.

(21) Appl. No.: 17/202,558

(22) Filed: Mar. 16, 2021

(65) Prior Publication Data

US 2022/0083222 A1 Mar. 17, 2022

(30) Foreign Application Priority Data

Sep. 16, 2020 (JP) ............................. JP2020-155598

(51) Int. Cl.
  *G06F 3/06* (2006.01)
(52) U.S. Cl.
  CPC ............ *G06F 3/064* (2013.01); *G06F 3/0604* (2013.01); *G06F 3/0679* (2013.01)
(58) Field of Classification Search
  USPC ......................................................... 711/154
  See application file for complete search history.

(56) References Cited

U.S. PATENT DOCUMENTS

| | | | |
|---|---|---|---|
| 9,436,595 B1* | 9/2016 | Benitez ............... | G06F 12/0246 |
| 2017/0351452 A1* | 12/2017 | Boyd ..................... | G06F 3/0611 |
| 2017/0371559 A1 | 12/2017 | Higgins et al. | |
| 2018/0067878 A1* | 3/2018 | Feng ..................... | G06F 12/023 |
| 2018/0349037 A1* | 12/2018 | Zhao ..................... | G06F 3/0611 |
| 2019/0004808 A1* | 1/2019 | Larson .................. | G06F 9/3851 |
| 2019/0042413 A1 | 2/2019 | Wysocki et al. | |
| 2019/0121558 A1 | 4/2019 | Lee et al. | |
| 2019/0163650 A1* | 5/2019 | Kim ..................... | G06F 13/4068 |
| 2020/0042475 A1* | 2/2020 | Venkataramani ....... | G06F 13/28 |
| 2021/0286623 A1* | 9/2021 | Navon .................. | G06F 3/0616 |

\* cited by examiner

*Primary Examiner* — Sanjiv Shah
*Assistant Examiner* — Elias Young Kim
(74) *Attorney, Agent, or Firm* — Oblon, McClelland, Maier & Neustadt, L.L.P.

(57) ABSTRACT

According to one embodiment, a storage device includes a nonvolatile memory and a controller. The controller manages memory area sets. The controller distributes a first memory area set into a first group. The controller distributes a second memory area set into a second group. The controller comprises first to fourth circuits. The first circuit processes a first read request from a host to the first memory area set. The second circuit processes a first write request from the host to the first memory area set. The third circuit processes a second read request from the host to the second memory area set. The fourth circuit processes a second write request from the host to the second memory area set.

18 Claims, 21 Drawing Sheets

| conditions | values defined by standard | explanations |
|---|---|---|
| number of 4KiB random reads | DTWIN Read Typical | number of 4KiB random reads that may be performed on NVM set in DTWIN by controller |
| number of writes in units of optimal write size | DTWIN Write Typical | number of writes in units of optimal write size that may be performed on NVM set in DTWIN by controller |
| maximum time | DTWIN Time Maximum | maximum time that controller is able to remain in DTWIN for NVM set |
| first minimum time | NDWIN Time Minimum Low | minimum time that controller needs to remain in NDWIN for NVM set. This is regardless of amount of time spent in previous DTWIN. |
| second minimum time | NDWIN Time Minimum High | minimum time that host allows controller to remain in NDWIN for NVM set after controller remained in previous DTWIN for maximum time of DTWIN. This is the time necessary to prepare for remaining in DTWIN for DTWIN Time Maximum. |

FIG. 4

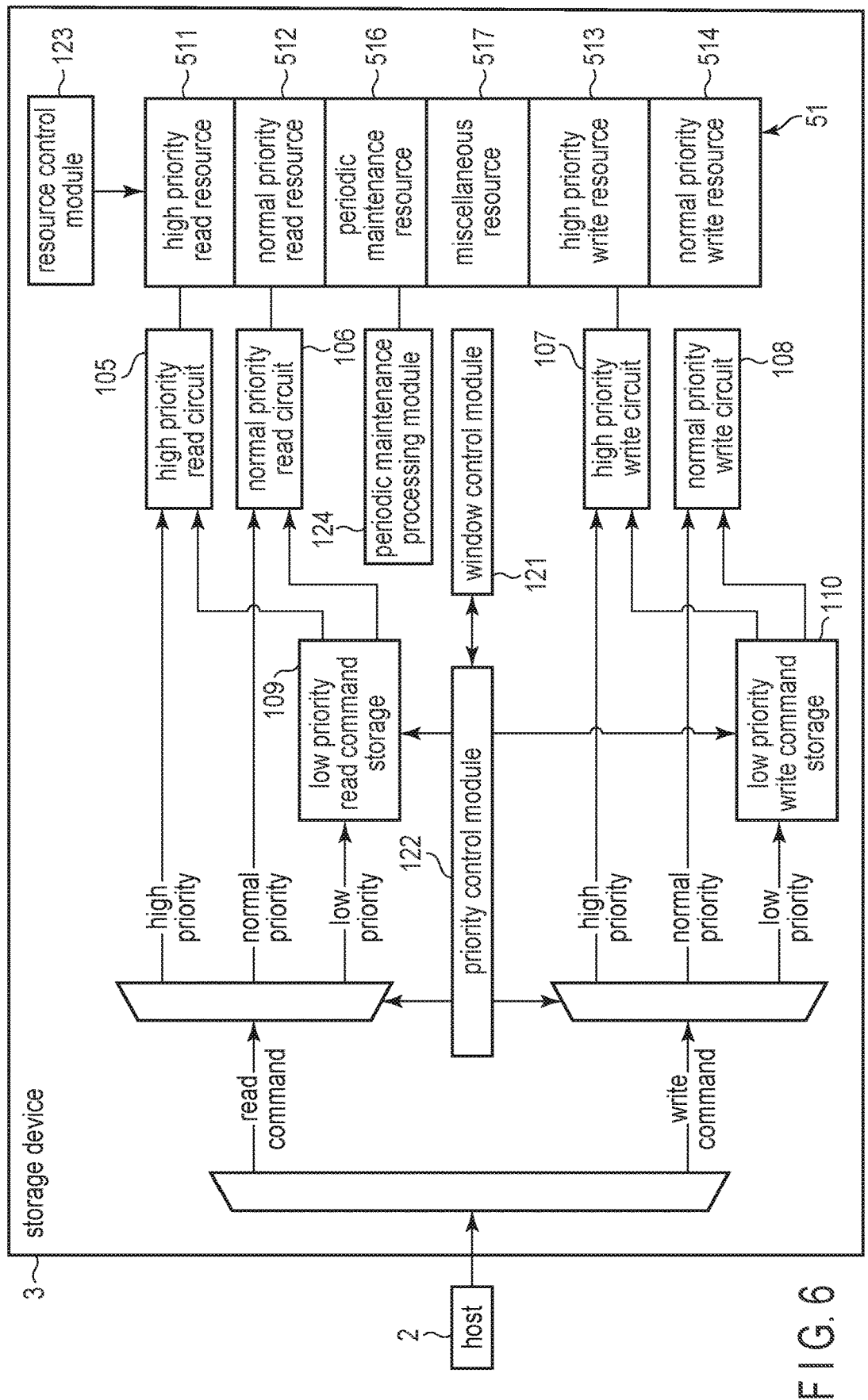
F I G. 6

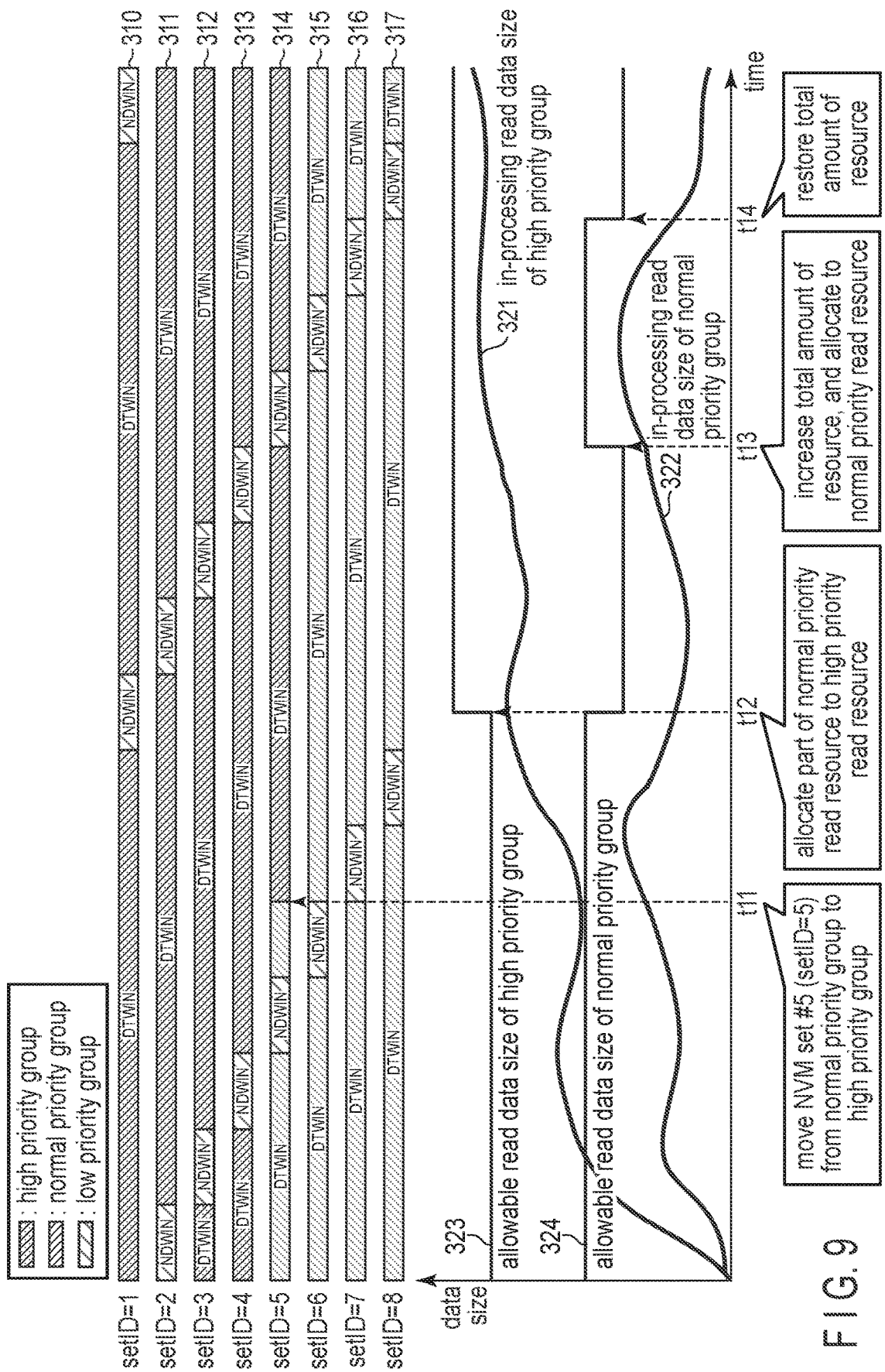
F I G. 9

| setID | default priority group | current priority group |
|---|---|---|
| 0 | high | high |
| 1 | high | low |
| 2 | high | high |
| 3 | high | high |
| 4 | normal | normal |
| 5 | normal | normal |
| 6 | normal | normal |
| 7 | normal | normal |

| priority group | default read resource amount | current read resource amount | allowable read data size | default write resource amount | current write resource amount | allowable write data size |
|---|---|---|---|---|---|---|
| high | | | | | | |
| normal | | | | | | |

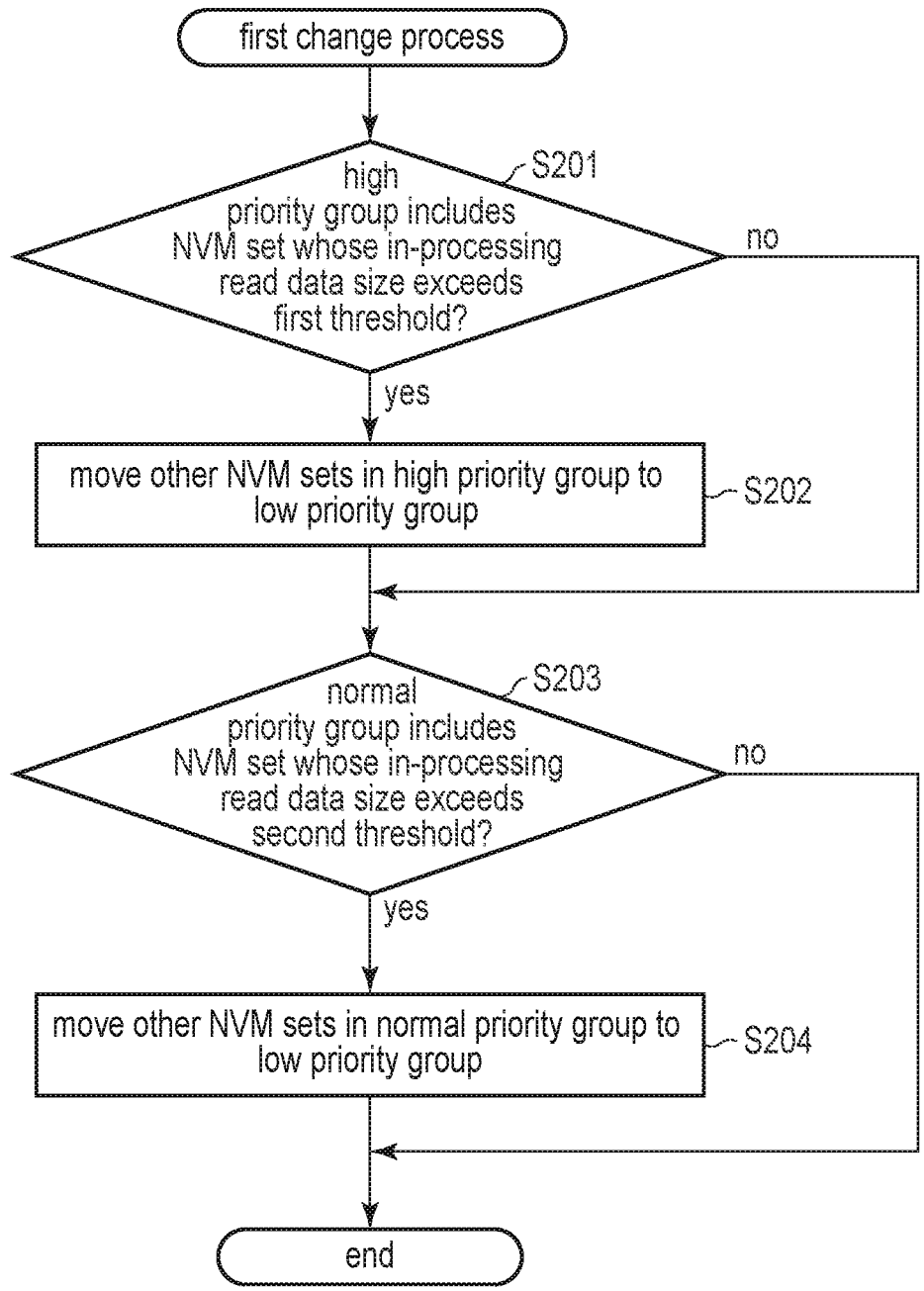
F I G. 16

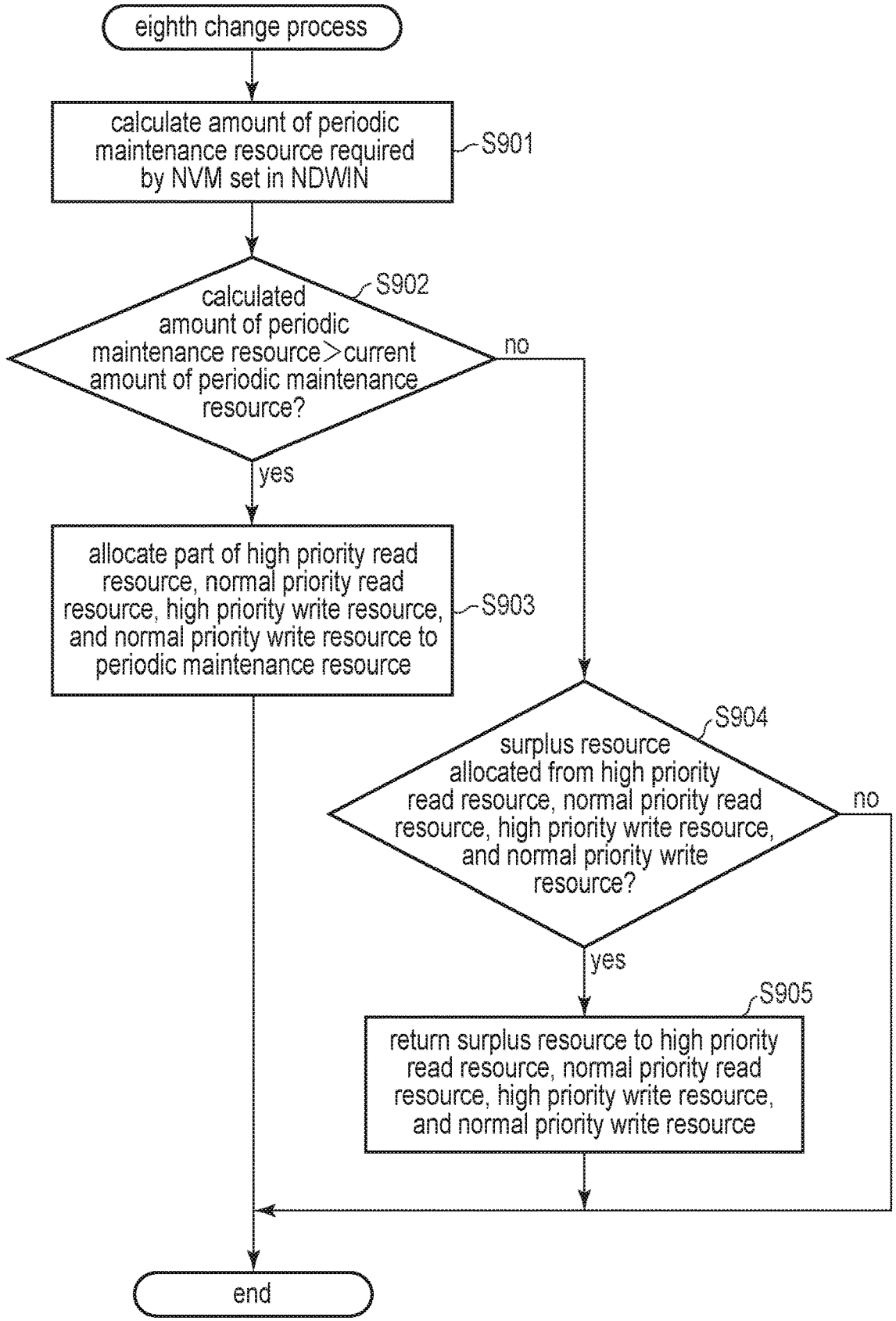
F I G. 23

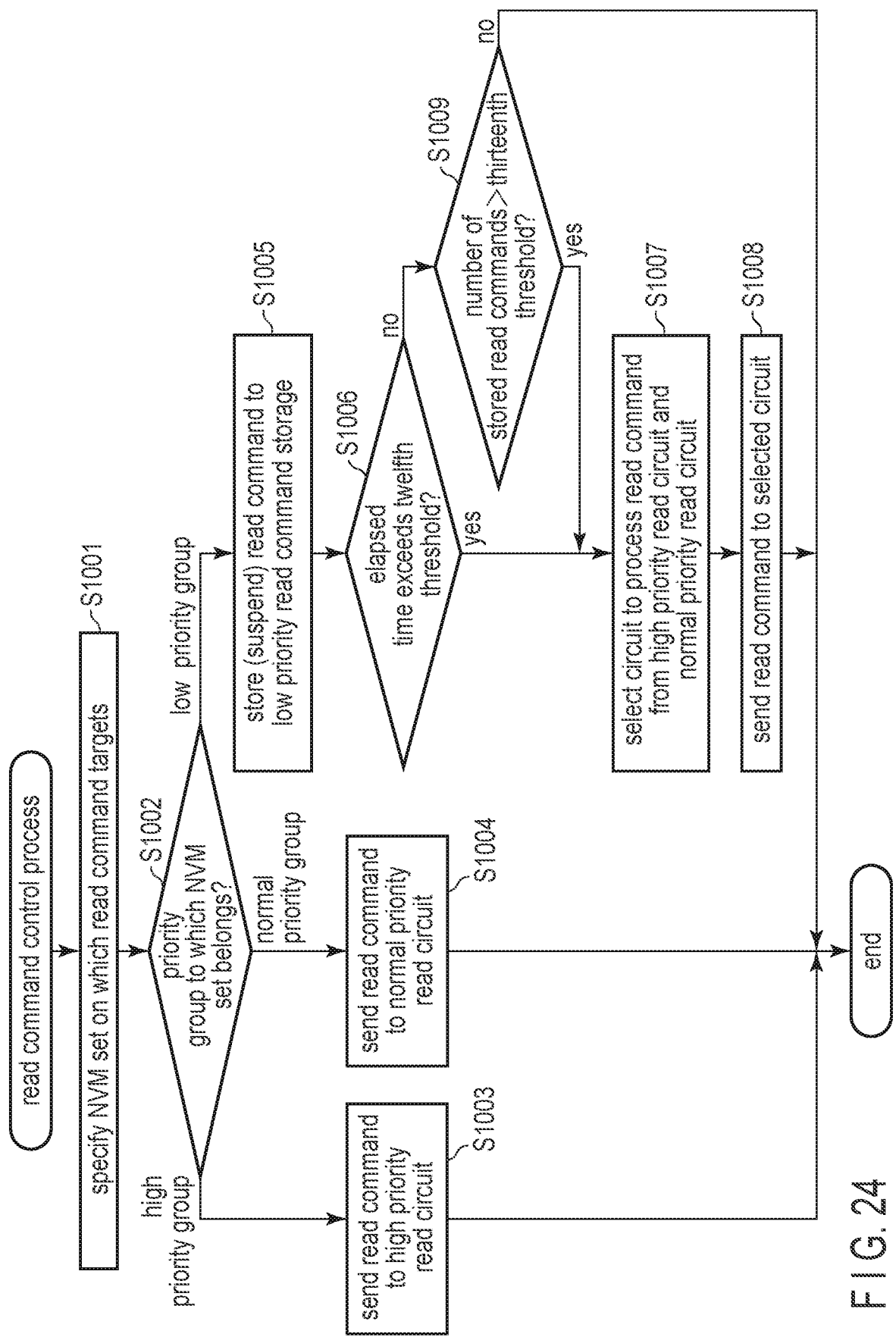
F I G. 24

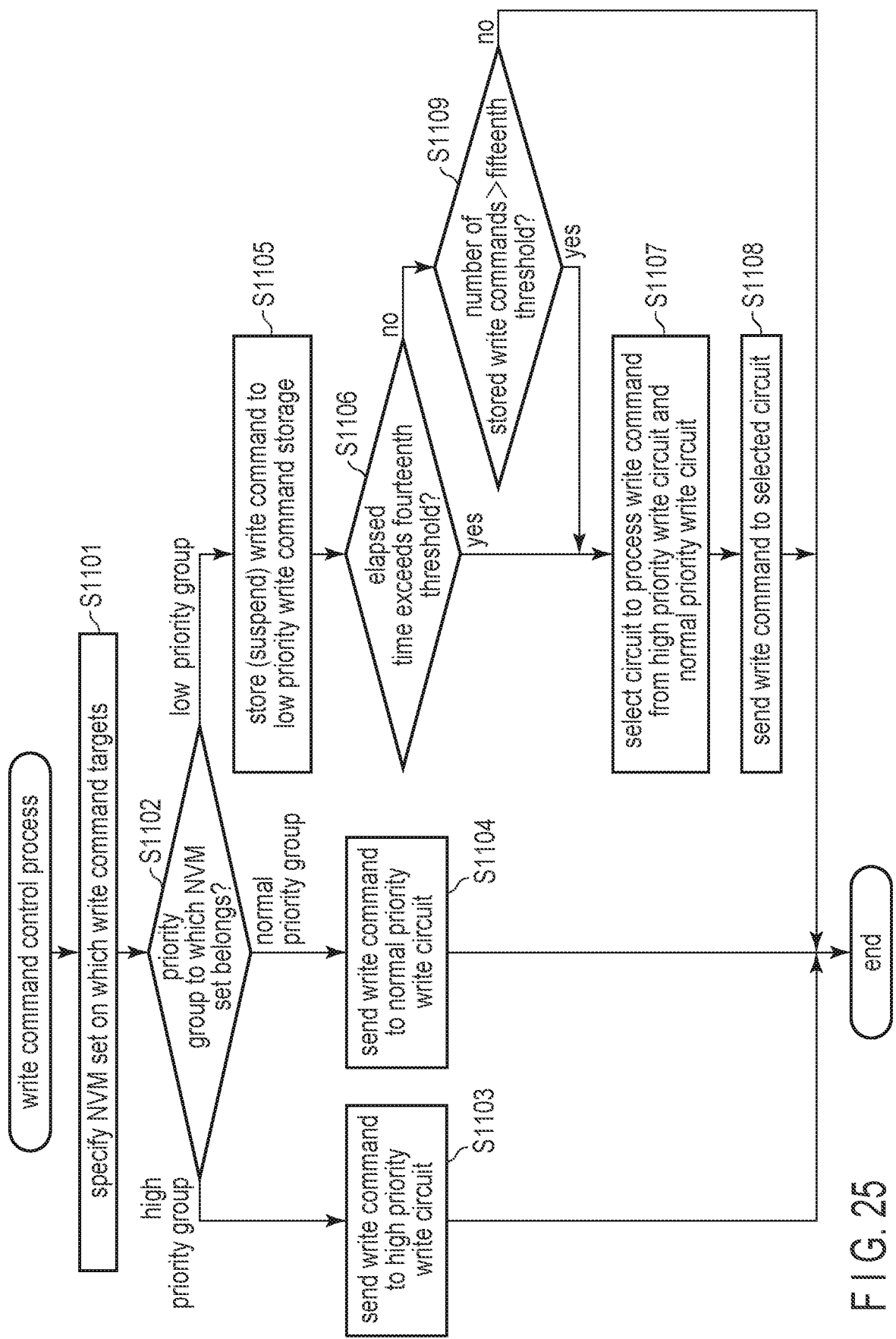
F I G. 25

STORAGE DEVICE AND CONTROL METHOD

CROSS-REFERENCE TO RELATED APPLICATIONS

This application is based upon and claims the benefit of priority from Japanese Patent Application No. 2020-155598, filed Sep. 16, 2020, the entire contents of which are incorporated herein by reference.

FIELD

Embodiments described herein relate generally to a technique for controlling a storage device that includes a nonvolatile memory.

BACKGROUND

In recent years, a storage device that includes a nonvolatile memory as a storage, has become widespread. As one of such storage devices, a solid state drive (SSD) has been known. The SSD includes a NAND flash memory.

The storage device may have a function for realizing an input/output determinism (IOD). The IOD is a feature to guarantee predictable latency.

BRIEF DESCRIPTION OF THE DRAWINGS

FIG. 4 illustrates an example of conditions in which the controller in the storage device according to the embodiment achieves predictable latency in accessing an NVM set.

FIG. 6 is a block diagram illustrating an example of a command processing operation executed in the storage device according to the embodiment.

FIG. 9 is a diagram illustrating a control example of grouping and resource allocation in accordance with an in-processing read data size for each group in the storage device according to the embodiment.

FIG. 16 is a flowchart illustrating an example of the procedure of a first change process executed by the CPU in the storage device according to the embodiment.

FIG. 23 is a flowchart illustrating an example of the procedure of an eighth change process executed by the CPU in the storage device according to the embodiment.

FIG. 24 is a flowchart illustrating an example of the procedure of a read command control process executed by the CPU in the storage device according to the embodiment.

FIG. 25 is a flowchart illustrating an example of the procedure of a write command control process executed by the CPU in the storage device according to the embodiment.

DETAILED DESCRIPTION

Hereinafter, embodiments will be described with reference to the drawings.

In general, according to one embodiment, a storage device includes a nonvolatile memory and a controller connected to the nonvolatile memory. The controller manages a plurality of memory area sets including a first memory area set and a second memory area set. The first memory area set includes a first plurality of memory areas that are obtained by logically dividing a memory area of the nonvolatile memory. The second memory area set includes a second plurality of memory areas that are obtained by logically dividing the memory area of the nonvolatile memory. The controller distributes the first memory area set into a first group. The controller distributes the second memory area set into a second group that is different from the first group. The controller comprises a first circuit configured to process a first read request from a host to the first memory area set distributed into the first group, a second circuit configured to process a first write request from the host to the first memory area set distributed into the first group, a third circuit configured to process a second read request from the host to the second memory area set distributed into the second group, and a fourth circuit configured to process a second write request from the host to the second memory area set distributed into the second group.

Hereinafter, embodiment(s) of the present invention will be described with reference to the accompanying drawings.

Figure 1:
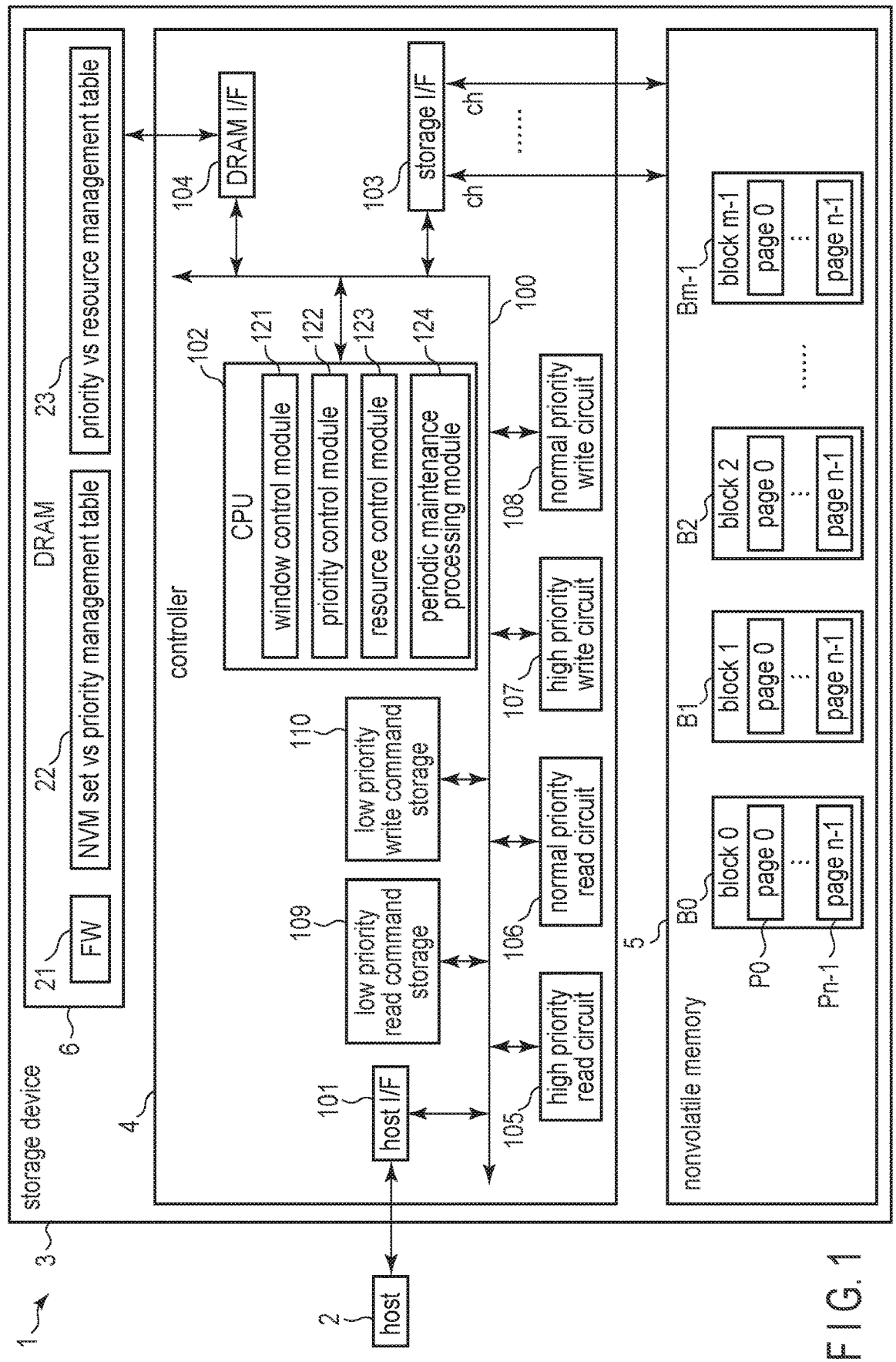
FIG. 1 is a block diagram illustrating a configuration example of an information processing system that includes a storage device according to an embodiment.

FIG. 1 is a block diagram illustrating a configuration example of an information processing system 1 that includes a storage device according to an embodiment. The information processing system 1 includes a host device 2 and a storage device 3.

The host device 2 is an information processing device external to the storage device 3. The host device 2 is, for example, a personal computer, a server computer, a mobile terminal such as a tablet computer or a smartphone, or an in-vehicle terminal such as a car navigation system. Hereinafter, the host device 2 is also referred to as a host 2.

The storage device 3 is configured to write data to and read data from a storage. The storage device 3 may be realized as, for example, a solid state drive (SSD). Further, the storage device 3 may be realized as, for example, a hard disk drive (HDD). The storage device 3 may function as a storage device of the host 2. The storage device 3 may be connected to the host 2 via a cable or a network. As interfaces for connecting the host 2 and the storage device 3, SCSI, serial attached SCSI (SAS), AT attachment (ATA), serial ATA (SATA), PCI express (PCIe) (registered trademark), Ethernet (registered trademark), Fibre channel, or NVM Express (NVMe) (registered trademark) may be used.

The storage device 3 includes a nonvolatile memory (NVM) 5 and a controller 4. The storage device 3 may include a random access memory (RAM) 6. The RAM 6 is a volatile memory. The RAM 6 is, for example, a dynamic random access memory (DRAM).

The nonvolatile memory 5 is, for example, a NAND type flash memory. The nonvolatile memory 5 may have a two-dimensional structure. Alternatively, the nonvolatile memory 5 may have a three-dimensional structure.

The nonvolatile memory 5 includes a memory cell array. The memory cell array includes memory cells. The memory cells may be disposed in a matrix.

The nonvolatile memory 5 may include multiple nonvolatile memory chips. The nonvolatile memory chip is, for example, a NAND type flash memory die. The nonvolatile memory chip includes multiple physical blocks B0 to Bm-1. The physical blocks each function as a minimum unit of a data erase operation. Each of the physical blocks B0 to Bm-1 includes multiple pages P0 to Pn-1. The pages each function as a unit of a data read operation. Each of the pages P0 to Pn-1 includes multiple memory cells connected to a single word line. The word line functions as a unit of a data write operation. The data write operation may be referred to as a data program operation.

The allowable maximum number of program/erase (P/E) cycles for each of the physical blocks is limited. One P/E cycle of a block includes a data erase operation and a data write operation (i.e., a data program operation). The data erase operation is an operation to erase data stored in all memory cells in the block. The data write operation is an operation to write data in each page of the block.

The controller 4 is a memory controller that controls the nonvolatile memory 5. The controller 4 is a circuit such as a system-on-a-chip (SoC). Each function of the controller 4 may be realized by dedicated hardware, a processor executing a program (e.g., firmware), or a combination thereof. The controller 4 is communicably connected to the nonvolatile memory 5.

The controller 4 executes a data management and a block management of the nonvolatile memory 5. The data management includes a management of mapping data. The mapping data indicates relationship between a logical address and a physical address. The logical address is an address used by the host 2 for addressing the storage device 3. As the logical address, for example, a logical block address (LBA) is used. The physical address indicates a location in the nonvolatile memory 5. The block management includes a bad block management, a wear leveling and a garbage collection.

The controller 4 includes a host interface (host I/F) 101, a central processing unit (CPU) 102, a storage interface (storage I/F) 103, a DRAM I/F 104, a high priority read circuit 105, a normal priority read circuit 106, a high priority write circuit 107, a normal priority write circuit 108, a low priority read command storage 109, and a low priority write command storage 110. The host I/F 101, the CPU 102, the storage I/F 103, the DRAM I/F 104, the high priority read circuit 105, the normal priority read circuit 106, the high priority write circuit 107, the normal priority write circuit 108, the low priority read command storage 109, and the low priority write command storage 110 may be mutually connected via a bus 100.

The host I/F 101 is an interface that performs communication between the storage device 3 and the outside. Examples of commands received from the outside include a write command and a read command.

The CPU 102 is at least one processor. The CPU 102 may be a circuit such as a part of an SoC. The CPU 102 operates as a window control module 121, a priority control module 122, a resource control module 123, and a periodic maintenance processing module 124. The CPU 102 realizes these operations on the basis of programs such as firmware (FW) 21.

The storage I/F 103 is an interface that performs communication between the controller 4 and the nonvolatile memory 5. The storage I/F 103 conforms to an interface standard such as a toggle double-data-rate (DDR) and an open NAND flash interface (ONFI). The storage I/F 103 may be connected to nonvolatile memory chips in the nonvolatile memory 5 via multiple channels (chs).

The DRAM I/F 104 is an interface that performs communication between the controller 4 and the RAM 6. The RAM 6 functions as temporary storage areas for data used in the storage device 3. The temporary storage areas of the RAM 6 are used as an area for storing the FW 21 and system data that are read from the nonvolatile memory 5, a cache area, and a buffer area. The system data includes an NVM set versus priority management table 22 and a priority versus resource management table 23, which are to be illustrated in detail later.

The high priority read circuit 105 processes a read command received via the host I/F 101. The read command processed by the high priority read circuit 105 has a high priority.

The normal priority read circuit 106 processes a read command received via the host I/F 101. The read command processed by the normal priority read circuit 106 has a priority lower than that of a read command processed by the high priority read circuit 105. This priority may be referred to as a normal priority.

The high priority write circuit 107 processes a write command received via the host I/F 101. The write command processed by the high priority write circuit 107 has a high priority.

The normal priority write circuit 108 processes a write command received via the host I/F 101. The write command processed by the normal priority write circuit 108 has a priority lower than that of a write command processed by the high priority write circuit 107. This priority may also be referred to as a normal priority.

The low priority read command storage 109 stores a read command received via the host I/F 101. The read command stored in the low priority read command storage 109 has a priority lower than that of a read command processed by the normal priority read circuit 106.

The low priority write command storage 110 stores a write command received via the host I/F 101. The write command stored in the low priority write command storage 110 has a priority lower than that of a write command processed by the normal priority write circuit 108.

Next, the storage device 3 that realizes the IOD will be described. The storage device 3 that realizes the IOD operates so as to guarantee predictable latency in an access from the host 2 to the storage device 3. That is, the storage device 3 that realizes the IOD guarantees that the host 2 can predict latency in an access from the host 2 to the storage device 3. To achieve the IOD, the storage device 3 supports, for example, the Predictable Latency Mode of the NVMe standard. The Predictable Latency Mode is a mode in which the storage device 3 operates to guarantee predictable latency in a read operation on an NVM set and in a write operation on an NVM set.

An NVM set is a collection of memory areas. Each of the memory areas in the NVM set is obtained by logically dividing a memory area of the nonvolatile memory 5. A logical address (for example, an LBA) is assigned to each of the memory areas in the NVM set. The number of memory areas in an NVM set and the number of NVM sets are freely set. The memory area in one NVM set is logically separated from a memory area in other NVM sets.

A memory area in an NVM set is, for example, a namespace (NS). The NVM set may contain one or more namespaces. The namespace inherits the attributes of the NVM set. One namespace is wholly contained within a single NVM set, that is, one namespace does not span more than one NVM set. A namespace is identified by, for example, using a namespace identifier. The namespace identifier may be used to identify each of one or more namespaces in an NVM set.

Figure 2:
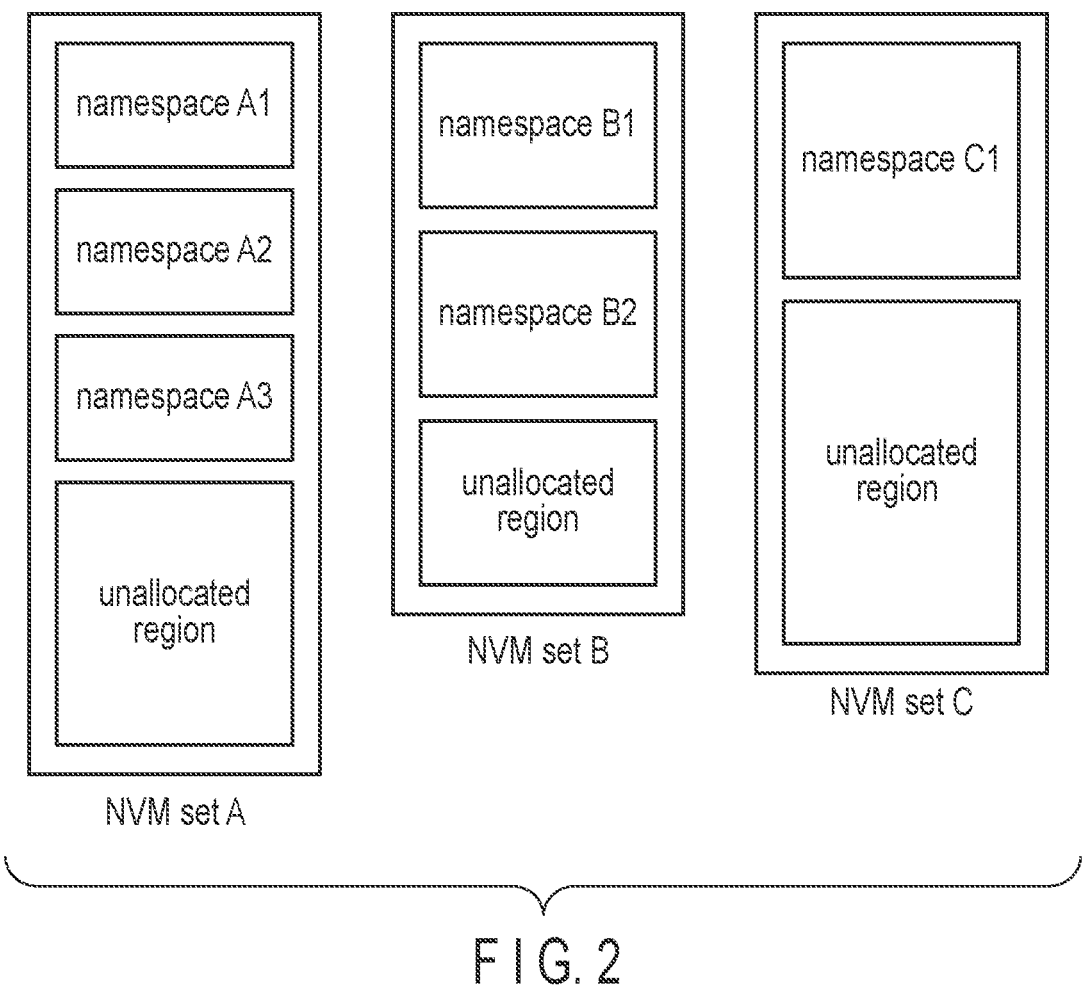
FIG. 2 is a diagram illustrating an example of nonvolatile memory sets (NVM sets) in the storage device according to the embodiment.

FIG. 2 is a diagram illustrating an example of NVM sets in the storage device 3 according to the embodiment. FIG. 2 illustrates three NVM sets A, B and C as an example. The NVM set A contains three namespaces A1, A2 and A3. The NVM set B contains two namespaces B1 and B2. The NVM set C contains one namespace C1. Each of the NVM sets A, B and C also contains unallocated regions. The unallocated regions include memory areas that are not yet allocated to any namespace.

Next, NVM sets in the storage device 3 that support the Predictable Latency Mode will be described. In the storage device 3 that supports the Predictable Latency Mode, the NVM sets and their associated namespaces have vendor specific quality of service attributes. Input/Output (I/O) commands that access memory areas in the same NVM set have the same quality of service attributes. I/O commands that access memory areas in one NVM set do not impact the quality of service of I/O commands that access memory areas in a different NVM set.

The controller 4 switches an operation on an NVM set between two types of operation periods. The two types of operation periods are periods in which the controller 4 performs different operations on the NVM set. That is, the controller 4 switches the operation on the NVM set by alternately transitioning between the two types of operation periods. One operation period is referred to as a Deterministic Window (DTWIN). The other operation period is referred to as a Non-Deterministic Window (NDWIN). Hereinafter, an operation period is also referred to as a window.

The DTWIN is the window indicative of the operation period during which the NVM set is able to provide deterministic latency. The deterministic latency corresponds to predictable latency. An NVM set for which the operation period of the controller 4 is the DTWIN is referred to as an NVM set in the DTWIN. The NVM set in the DTWIN is able to provide deterministic latency for read and write operations. That is, the controller 4 guarantees predictable latency in read and write operations on the NVM set in the DTWIN.

The NDWIN is the window indicative of the operation period during which the NVM set is not able to provide deterministic latency. The NVM set for which the operation period of the controller 4 is the NDWIN is referred to as an NVM set in the NDWIN. The NVM set in the NDWIN is not able to provide deterministic latency for read and write operations as a result of preparing for a DTWIN subsequent to the current NDWIN. That is, the controller 4 does not guarantee predictable latency in read and write operations on the NVM set in the NDWIN.

The periodic maintenance processing module 124 performs a periodic maintenance process on an NVM set in the NDWIN. The periodic maintenance process is a background task process. The periodic maintenance process includes, for example, a garbage collection process.

The window control module 121 transitions the operation period of the controller 4 on an NVM set in accordance with a request by the host 2. Alternatively, the window control module 121 autonomously transitions the operation period of the controller 4 on an NVM set.

Figure 3:
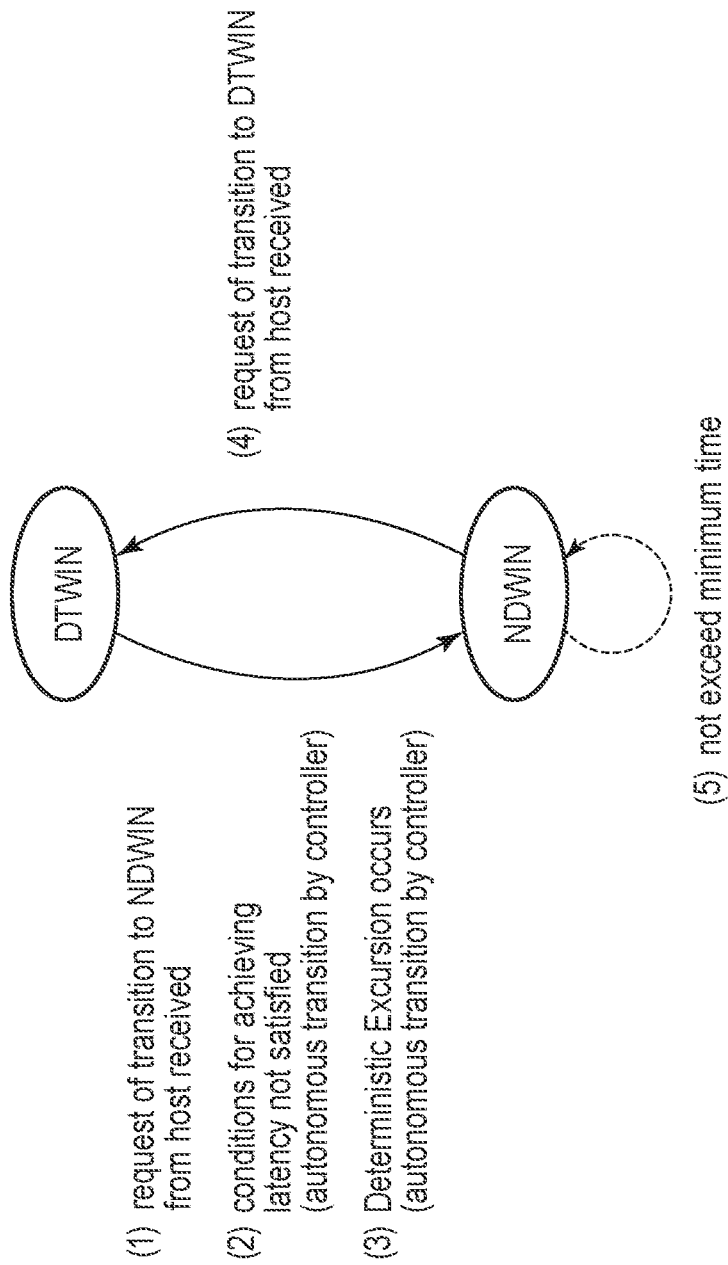
FIG. 3 is a diagram illustrating an example in which an operation period of a controller on an NVM set in the storage device according to the embodiment transitions between a Deterministic Window (DTWIN) and a Non-Deterministic Window (NDWIN).

FIG. 3 is a diagram illustrating an example in which the operation period of the controller 4 on an NVM set in the storage device 3 according to the embodiment transitions between the DTWIN and the NDWIN. The operation period of the controller 4 transitions independently for each of the NVM sets in the storage device 3.

The window control module 121 transitions the operation period of the controller 4 on each NVM set between the DTWIN and the NDWIN. Specifically, the operation period of the controller 4 on an NVM set is transitioned from the DTWIN to the NDWIN according to the following operations (1) to (3) by the window control module 121.

(1) When receiving a request of transition to the NDWIN from the host 2, the window control module 121 transitions the operation period of the controller 4 on the NVM set from the DTWIN to the NDWIN.

(2) When conditions for achieving predictable latency are not satisfied, the window control module 121 transitions the operation period of the controller 4 on the NVM set from the DTWIN to the NDWIN.

(3) When a Deterministic Excursion occurs, the window control module 121 transitions the operation period of the controller 4 on the NVM set from the DTWIN to the NDWIN.

The operations (2) and (3) are operations based on an autonomous determination by the window control module 121, which are not related to a request from the host 2.

In addition, the operation period of the controller 4 on the NVM set is transitioned from the NDWIN to the DTWIN according to the following operation (4) by the window control module 121.

(4) When receiving a request of transition to the DTWIN from the host 2, the window control module 121 transitions the operation period of the controller 4 on the NVM set from the NDWIN to the DTWIN.

The operation period of the controller 4 on the NVM set may be kept in the NDWIN according to the following operation (5) by the window control module 121.

(5) When receiving a request of transition to the DTWIN from the host 2 while the operation period of the controller 4 on the NVM set does not exceed a minimum time period which allows the NVM set to remain in the NDWIN, the window control module 121 may not transition the operation period of the controller 4 on the NVM set to the DTWIN. That is, the operation period of the controller 4 on the NVM set may remain in the NDWIN.

Here, the conditions for achieving predictable latency of (2) will be described.

FIG. 4 is a diagram illustrating an example of conditions for the controller 4 in the storage device 3 according to the embodiment to achieve predictable latency in accessing an NVM set. The conditions for achieving the predictable latency include, for example, the number of 4KiB random reads, the number of writes in units of an optimal write size, a maximum time, a first minimum time, and a second minimum time.

The number of 4 KiB random reads is defined as DTWIN Read Typical in the NVMe standard. The number of 4 KiB random reads indicates the number of 4 KiB random reads that may be performed on the corresponding NVM set in the DTWIN by the controller 4.

The number of writes in units of the optimal write size is defined as DTWIN Write Typical in the NVMe standard. The number of writes in units of the optimal write size indicates the number of writes in units of the optimal write size that may be performed on the corresponding NVM set in the DTWIN by the controller 4.

The maximum time is defined as DTWIN Time Maximum in the NVMe standard. The maximum time indicates the maximum time that the controller 4 is able to remain in the DTWIN for the corresponding NVM set.

The first minimum time is defined as NDWIN Time Minimum Low in the NVMe standard. The first minimum time indicates the minimum time that the controller 4 needs to remain in the NDWIN for the corresponding NVM set before entering the DTWIN regardless of the amount of time spent in the previous DTWIN.

The second minimum time is defined as NDWIN Time Minimum High in the NVMe standard. The second minimum time indicates the minimum time that the controller 4 needs to remain in the NDWIN for the corresponding NVM set before entering the DTWIN after remaining in the previous DTWIN for the maximum time. The second minimum time may also be referred to as the minimum time for which the host 2 should allow the controller 4 to remain in the NDWIN for the corresponding NVM set after remaining in the previous DTWIN for the maximum time period. The second minimum time is necessary for the preparation for the controller 4 to remain in the next DTWIN for the maximum time.

The maximum time, the first minimum time and the second minimum time are specified, for example, in milliseconds.

The controller 4 may notify the host 2 of the conditions for achieving predictable latency. In addition, the controller 4 operates as followings (A) to (C) to achieve the predictable latency (that is, to realize the IOD).

(A) The controller 4 performs a read process and a write process on an NVM set in the DTWIN within predictable latency while the conditions presented from the storage device 3 to the host 2 are satisfied.

(B) The controller 4 performs a periodic maintenance process on the NVM set in the NDWIN while the conditions presented from the storage device 3 to the host 2 are satisfied.

(C) The controller 4 performs a read process and a write process on each of the NVM sets so as not to impact each other among the NVM sets.

Next, a configuration for performing a read process and a write process within predictable latency on each of NVM sets in the DTWIN without impacting each other among the NVM sets will be described. As one of such a configuration, it is conceivable to provide the controller 4 with a read processing circuit for each NVM set and a write processing circuit for each NVM set, and a dedicated resource (e.g., circuit, memory) used by each processing circuit. For example, when managing 16 NVM sets, the controller 4 is provided with 16 read processing circuits, 16 write processing circuits, and the dedicated resource used by each processing circuit. However, in such a configuration in which the read processing circuit, the write processing circuit and the resource are provided for each NVM set, the size of the storage device becomes large.

For this reason, in the storage device 3 according to the present embodiment, the controller 4 distributes the NVM sets into a high priority group, a normal priority group, and a low priority group. That is, the controller 4 manages the NVM sets in units of a group.

The controller 4 includes the high priority read circuit 105 for the high priority group. The controller 4 allocates a dedicated read resource to the high priority group. The read resource is a resource for data transfer in a read process. The read resource includes a read buffer.

The high priority read circuit 105 processes a read command using the read resource of the high priority group. Read commands processed by the high priority read circuit 105 are commands to NVM sets belonging to the high priority group.

The controller 4 includes the high priority write circuit 107 also for the high priority group. The controller 4 allocates a dedicated write resource to the high priority group. The write resource is a resource for data transfer in a write process. The write resource includes a write buffer.

The high priority write circuit 107 processes a write command using the write resource of the high priority group. Write commands processed by the high priority write circuit 107 are commands to NVM sets belonging to the high priority group.

The controller 4 includes the normal priority read circuit 106 for the normal priority group. The controller 4 allocates a dedicated read resource to the normal priority group.

The normal priority read circuit 106 processes a read command using the read resource of the normal priority group. Read commands processed by the normal priority read circuit 106 are commands to NVM sets belonging to the normal priority group.

The controller 4 includes the normal priority write circuit 108 also for the normal priority group. The controller 4 allocates a dedicated write resource to the normal priority group.

The normal priority write circuit 108 processes a write command using the write resource of the normal priority group. Write commands processed by the normal priority write circuit 108 are commands to NVM sets belonging to the normal priority group.

In this way, the storage device 3 is provided with a read circuit, a write circuit and resources for each of the high and normal priority groups. The storage device 3 uses the read circuit, the write circuit and the resources for each group to guarantee predictable latency of read and write processes on NVM sets in the DTWIN. As a result, in the storage device 3, for example, as compared with the case where a dedicated read circuit, a dedicated write circuit, a dedicated read resource, and a dedicated write resource are provided for each NVM set, it is possible to reduce the number of processing circuits and the amount of resources provided to guarantee the predictable latency. Therefore, the circuit scale related to the controller 4 and resources in the storage device 3 can be reduced.

Further, the controller 4 may dynamically change the grouping and the amount of resources allocated to each group in accordance with the operation state of the storage device 3. When a group contains an NVM set that is being increasingly accessed, the controller 4 moves (or, redistributes) the NVM set of the group to another group, for example. Alternatively, when a group contains an NVM set that is being increasingly accessed, the controller 4 allocates, to the group, part of the resource that is allocated to another group.

In the storage device 3, the amount of resources provided to guarantee the predictable latency can be further reduced by dynamically changing the grouping and the amount of resources allocated. Therefore, the circuit scale related to the resources in the storage device 3 can be reduced.

Next, the priority groups to which the NVM sets in the storage device 3 belong will be described. One NVM set belongs to one of the high priority group, the normal priority group and the low priority group. The high priority group, the normal priority group and the low priority group will be described respectively.

(High Priority Group)

The high priority group has a first priority. The predictable latency is guaranteed for the high priority group. The high priority group has a short command response time.

More specifically, the controller 4 guarantees the predictable latency in a read access and a write access by the host 2 to an NVM set that belongs to the high priority group. The maximum response time t0 a read command to an NVM set that belongs to the high priority group, and the maximum response time t0 a write command to an NVM set that belongs to the high priority group are each, for example, a first time. In other words, when receiving from the host 2 a read command or a write command to the NVM set that belongs to the high priority group, the controller 4 transmits to the host 2 a response to the received read command or write command within the predetermined first time.

The controller 4 also includes dedicated processing circuits for the high priority group. The controller 4 allocates dedicated resources to the high priority group. The controller 4 uses the processing circuits and the resources corresponding to the high priority group to process the read command and the write command to the NVM set that belongs to the high priority group at any time. Details of the processing circuits and the resources corresponding to the high priority group will be described later with reference to FIG. 6.

(Normal Priority Group)

The normal priority group has a second priority lower than the first priority. The predictable latency is guaranteed for the normal priority group. The normal priority group has a long command response time.

More specifically, the storage device 3 guarantees the predictable latency in a read access and a write access by the host 2 to an NVM set that belongs to the normal priority group. The maximum response time t0 a read command to an NVM set that belongs to the normal priority group, and the maximum response time t0 a write command to an NVM set that belongs to the normal priority group are each, for example, a second time. In other words, when receiving from the host 2 a read command or a write command to an NVM set that belongs to the normal priority group, the controller 4 transmits to the host 2 a response to the received read command or write command within the predetermined second time. The second time is longer than the first time.

The controller 4 includes dedicated processing circuits for the normal priority group. The controller 4 allocates dedicated resources to the normal priority group. The controller 4 uses the processing circuits and the resources corresponding to the normal priority group to process a read command and a write command to an NVM set that belongs to the normal priority group at any time. Details of the processing circuits and the resources corresponding to the normal priority group will be described later with reference to FIG. 6.

(Low Priority Group)

The low priority group has a third priority that is lower than the second priority. The low priority group has an extremely long command response time. Even an NVM set for which the predictable latency should be guaranteed may be allocated to the low priority group. An NVM set for which the predictable latency is not guaranteed may also be allocated to the low priority group.

More specifically, when the host 2 accesses an NVM set that belongs to the low priority group and for which the predictable latency should be guaranteed, the controller 4 guarantees the predictable latency. When the host 2 accesses an NVM set that belongs to the low priority group and for which the predictable latency is not guaranteed, the controller 4 does not guarantee the predictable latency. The controller 4 may respond to each of read and write commands to an NVM set that belongs to the low priority group after a period of the second time has passed.

The controller 4 does not include a dedicated processing circuit for the low priority group. The controller 4 does not allocate a dedicated resource to the low priority group. As a result, the circuits and the amount of resources included in the storage device 3 can be reduced.

The controller 4 includes the low priority read command storage 109 and the low priority write command storage 110.

The low priority read command storage 109 stores a read command. The stored read command is a command to an NVM set that belongs to the low priority group.

The low priority write command storage 110 stores a write command. The stored write command is a command to an NVM set that belongs to the low priority group.

The controller 4 suspends (or, keeps in pending) a process of the stored command. Then, the controller 4 may process the stored command at specific timing. The controller 4 uses the processing circuit for the high priority group or the processing circuit for the normal priority group to process the stored command.

Figure 5:
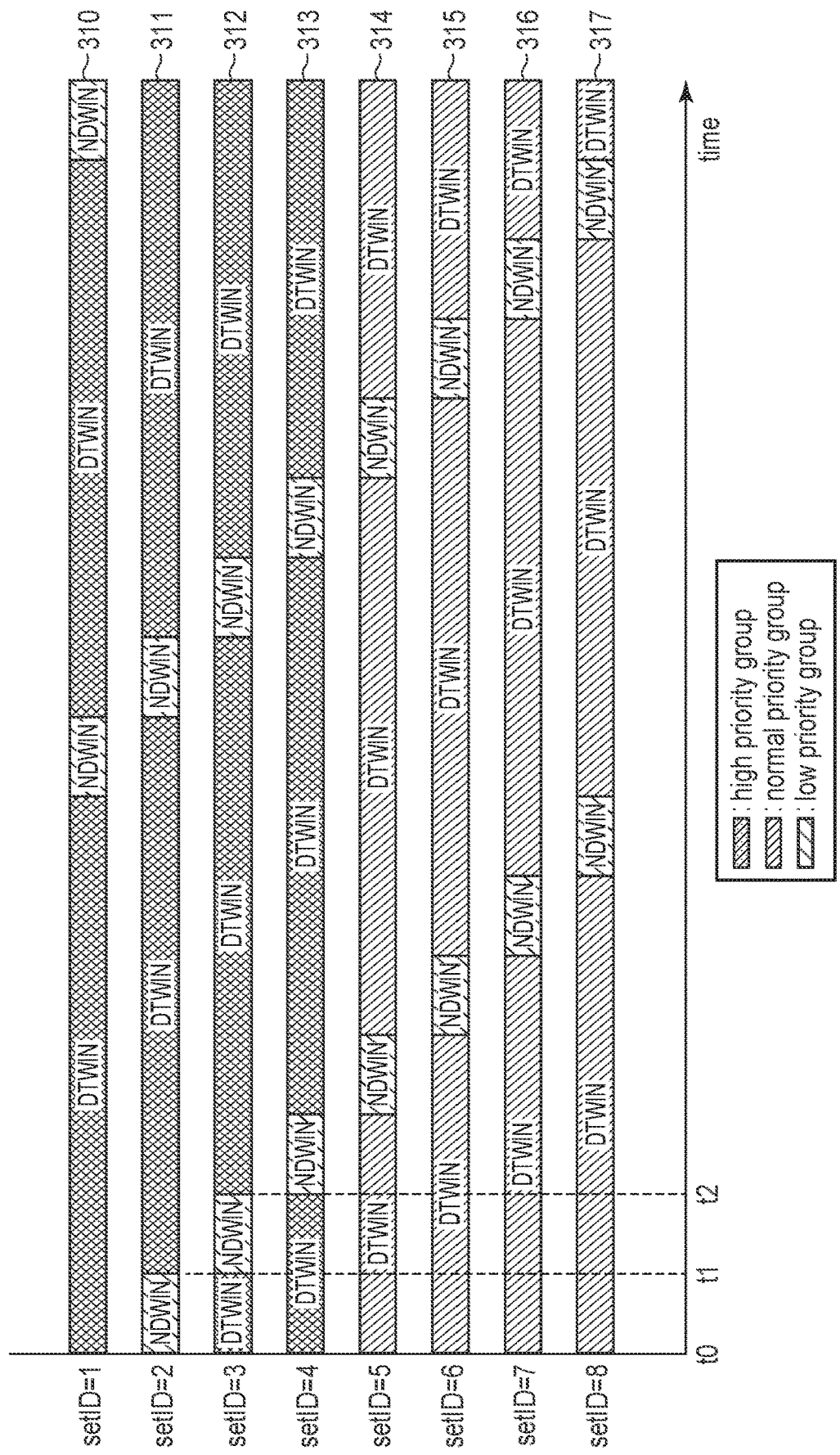
FIG. 5 is a diagram illustrating an example of transitioning a window and a priority group regarding NVM sets in the storage device according to the embodiment.

FIG. 5 is a diagram illustrating an example of transitioning a window and a priority group related to the NVM sets in the storage device 3 according to the embodiment. Here, a case in which eight NVM sets are set in the nonvolatile memory 5 is exemplified. The eight NVM sets are identified by setIDs from one to eight. Each setID (NVM Set Identifier) is information for identifying an NVM set. In the following, the NVM set whose setID is x is referred to as an NVM set #x. Here, x is an integer greater than or equal to one. Note that any number of NVM sets may be set for the nonvolatile memory 5.

FIG. 5 illustrates transitions 310 to 317 of the window and the priority group that correspond to the NVM sets #1 to #8, respectively.

(Window Transition)

First, the transition of the operation period of the controller 4 on an NVM set will be described. In the following, the transition of the operation period of the controller 4 on an NVM set is also referred to as a window transition of an NVM set.

The window control module 121 controls the window transition of each NVM set. The window control module 121 performs control, for example, that one of the NVM sets is in the NDWIN and the other NVM sets are in the DTWIN at a certain time. The window control module 121 may repeatedly control the window transition, for example, at regular time intervals.

In the example illustrated in FIG. 5, at time t0, the window control module 121 keeps the operation period of the controller 4 on the NVM set #1 in the DTWIN. The window control module 121 transitions the operation period of the controller 4 on the NVM set #2 to the NDWIN. The window control module 121 keeps the operation period of the controller 4 on each of the other NVM sets #3 to #8 in the DTWIN.

The transition 310 of the NVM set #1 indicates that the operation period of the controller 4 on the NVM set #1 remains in the DTWIN at time t0. The transition 311 of the NVM set #2 indicates that the operation period of the controller 4 on the NVM set #2 transitions to the NDWIN at time t0. The transitions 312 to 317 of the NVM sets #3 to #8 indicate that the operation period of the controller 4 on each of the NVM sets #3 to #8 remains in the DTWIN at time t0.

Next, at time t1, the window control module 121 transitions the operation period of the controller 4 on the NVM set #2 to the DTWIN. The window control module 121 transitions the operation period of the controller 4 on the NVM set #3 to the NDWIN. The window control module 121 keeps the operation period of the controller 4 on each of the other NVM sets #1 and #4 to #8 in the DTWIN.

The transition 311 of the NVM set #2 indicates that the operation period of the controller 4 on the NVM set #2 transitions to the DTWIN at time t1. The transition 312 of the NVM set #3 indicates that the operation period of the controller 4 on the NVM set #3 transitions to the NDWIN at time t1. The transitions 310 and 313 to 317 of the NVM sets #1 and #4 to #8 indicate that the operation period of the controller 4 on each of the NVM sets #1, #4 to #8 remains in the DTWIN at time t1.

Next, at time t2, the window control module 121 transitions the operation period of the controller 4 on the NVM set #3 to the DTWIN. The window control module 121 transitions the operation period of the controller 4 on the NVM set #4 to the NDWIN. The window control module 121 keeps the operation period of the controller 4 on each of the other NVM sets #1, #2 and #5 to #8 in the DTWIN.

The transition 312 of the NVM set #3 indicates that the operation period of the controller 4 on the NVM set #3 transitions to the DTWIN at time t2. The transition 313 of the NVM set #4 indicates that the operation period of the controller 4 on the NVM set #4 transitions to the NDWIN at time t2. The transitions 310, 311 and 314 to 317 of the NVM sets #1, #2 and #5 to #8 indicate that each of the operation periods of the controller 4 on the NVM sets #1, #2 and #5 to #8 remains in the DTWIN at time t2.

In the same way thereafter, the window control module 121 performs control so that the operation period of the controller 4 on one NVM set transitions to the DTWIN, the operation period of the controller 4 on another NVM set transitions to the NDWIN, and the operation period of the controller 4 on each of the other NVM sets remains in the DTWIN at a certain time.

By controlling the window transition, when one NVM set is in the NDWIN at any time, the number of NVM sets in the DTWIN is equal to a number obtained by subtracting one from the total number of the NVM sets in the storage device 3 (in an example of FIG. 5, 8−1=7). Therefore, the number of NVM sets of which the controller 4 is required to guarantee the predictable latency is the number obtained by subtracting one from the total number of the NVM sets. A state in which one NVM set is in the NDWIN at any time and the other NVM sets remain in the DTWIN is also called an ideal state.

When receiving a request of transition to the DTWIN from the host 2, the window control module 121 may control a timing when the operation period of the controller 4 on the NVM set transitions from the NDWIN to the DTWIN on the basis of the first minimum time (NDWIN Time Minimum Low) and the second minimum time (NDWIN Time Minimum High). In addition, unless the host 2 issues commands for which the predictable latency cannot be guaranteed (that is, as long as the conditions for achieving the predictable latency are satisfied), the window control module 121 can keep the operation period of the controller 4 on an NVM set to the DTWIN for the maximum time (DTWIN Time Maximum). Therefore, the window control module 121 can maintain the window transitions of the NVM sets close to the ideal state.

The window transition illustrated in FIG. 5 is an example indicative of an ideal state. The operation periods of the controller 4 on all NVM sets #1 to #8 may be the DTWIN at the same time. Alternatively, the operation periods of the controller 4 on two or more NVM sets may be the NDWIN at the same time.

(Priority Group Transition)

The transition of the priority group of the NVM set will be described. Here, it is assumed that the NVM set with a smaller setID has a shorter maximum command response time t0 guarantee the predictable latency.

The priority control module 122 groups NVM sets. More specifically, the priority control module 122 selects a group to which each NVM set is to belong from the high priority group, the normal priority group and the low priority group. The selection of the group is based on whether the predictable latency should be guaranteed and the maximum command response time t0 guarantee the predictable latency. In other words, the group selection is to allocate any of the high priority, the normal priority and the low priority to each NVM set.

The priority control module 122 determines that the predictable latency of an NVM set in the DTWIN should be guaranteed. The priority control module 122 distributes an NVM set for which the predictable latency should be guaranteed and whose maximum command response time is short, into the high priority group. In addition, the priority control module 122 distributes an NVM set for which the predictable latency should be guaranteed and whose maximum command response time is long, into the normal priority group.

For example, the priority control module 122 distributes the four NVM sets #1 to #4 into the high priority group in order from the NVM set whose maximum command response time for guaranteeing predictable the latency is the shortest. Then, the priority control module 122 distributes the other four NVM sets #5 to #8 (that is, the NVM sets whose maximum command response time is long) into the normal priority group. The priority group into which an NVM set is distributed on the basis of the maximum command response time t0 guarantee the predictable latency is also called the default priority group. The priority control module 122 may determine a default priority group of each NVM set in an initial setting performed in response to the start of the storage device 3.

Further, the priority control module 122 determines, for each NVM set in the NDWIN, that it is not necessary to guarantee the predictable latency. For this reason, the priority control module 122 moves an NVM set for which the operation period of the controller 4 has transitioned from the DTWIN to the NDWIN, from the high priority group or the normal priority group to the low priority group. In addition, the priority control module 122 moves an NVM set for which the operation period of the controller 4 has transitioned from the NDWIN to the DTWIN, back from the low priority group to the high priority group or normal priority group to which the NVM set previously belonged.

In the example illustrated in FIG. 5, at time t0, the priority control module 122 distributes the NVM sets #1, #3 and #4 into the high priority group. The priority control module 122 distributes the NVM sets #5 to #8 to the normal priority group. The priority control module 122 distributes the NVM set #2 to the low priority group. Note that at time t0, the operation period of the controller 4 on the NVM set #2 transitions to the NDWIN.

The transitions 310, 312 and 313 of the NVM sets #1, #3 and #4 indicate that the NVM sets #1, #3 and #4 belong to the high priority group at time t0. The transition 311 of the NVM set #2 indicates that the NVM set #2 belongs to the low priority group at time t0. The transitions 314 to 317 of the NVM sets #5 to #8 indicate that the NVM sets #5 to #8 belong to the normal priority group at time t0.

Next, the priority control module 122 moves the NVM set #2 to the high priority group at time t1. The priority control module 122 moves the NVM set #3 to the low priority group at time t1. Note that at time t1, the operation period of the controller 4 on the NVM set #2 transitions from the NDWIN to the DTWIN. The operation period of the controller 4 on the NVM set #3 transitions from the DTWIN to the NDWIN. The NVM sets #1 and #4 remain belonging to the high priority group. The NVM sets #5 to #7 remain belonging to the normal priority group.

The transitions 310, 311 and 313 of the NVM sets #1, #2 and #4 indicate that the NVM sets #1, #2 and #4 belong to the high priority group at time t1. The transition 312 of the NVM set #3 indicates that the NVM set #3 belongs to the low priority group at time t1. The transitions 314 to 317 of the NVM sets #5 to #8 indicate that the NVM sets #5 to #8 belong to the normal priority group at time t1.

The priority control module 122 then moves the NVM set #3 back to the high priority group at time t2. The priority control module 122 moves the NVM set #4 to the low priority group at time t2. Note that at time t2, the operation period of the controller 4 on the NVM set #3 transitions from the NDWIN to the DTWIN. The operation period of the controller 4 on the NVM set #4 transitions from the DTWIN to the NDWIN. The NVM sets #1 and #2 remain belonging to the high priority group. The NVM sets #5 to #8 remain belonging to the normal priority group.

The transitions 310 to 312 of the NVM sets #1 to #3 indicate that the NVM sets #1 to #3 belong to the high priority group at time t2. The transition 313 of the NVM set #4 indicates that the NVM set #4 belongs to the low priority group at time t2. The transitions 314 to 317 of the NVM sets #5 to #8 indicate that the NVM sets #5 to #8 belong to the normal priority group at time t2.

In the same manner thereafter, the priority control module 122 changes the priority group to which the corresponding NVM set belongs in accordance with the transition of the operation period of the controller 4. Therefore, the priority control module 122 can distribute an NVM set in the DTWIN into either the high priority group or the normal priority group on the basis of the maximum command response time t0 guarantee the predictable latency. Further, the priority control module 122 can distribute an NVM set in the NDWIN into the low priority group.

FIG. 6 is a block diagram illustrating a command processing operation executed in the storage device 3 according to the embodiment. The command processing operation is an operation for processing a read command or a write command received via the host I/F 101.

The window control module 121 controls the transition of the operation period of the controller 4 on an NVM set between the DTWIN and the NDWIN. The operation of the window control module 121 is as described in detail above with reference to FIGS. 3 and 5.

The priority control module 122 controls a priority group to which an NVM set belongs. In addition, the priority control module 122 identifies a priority group to which an NVM set on which a read command or a write command targets belongs. More specifically, the priority control module 122 uses, for example, a namespace identifier included in the read command or the write command to specify the namespace on which the read command or the write command targets. Then, the priority control module 122 specifies an NVM set including the identified namespace. Alternatively, the priority control module 122 specifies an NVM set on which a read command or a write command targets on the basis of which NVM set corresponds to a submission queue from which the read command or the write command has been acquired. One submission queue stores commands to one corresponding NVM set. Then, the priority control module 122 specifies a priority group to which the specified NVM set belongs. The priority control module 122 switches a destination to transmit the command according to the specified priority group.

An example of switching the destination and processing of the command according to the switching will be described below.

(1) In a Case where a Read Command to an NVM Set Belonging to the High Priority Group is Received The priority control module 122 transmits the read command to the high priority read circuit 105. The high priority read circuit 105 is a dedicated read circuit for the high priority group. The high priority read circuit 105 uses a high priority read resource 511 to perform the read process according to the read command. That is, the high priority read circuit 105 uses the high priority read resource 511 to read data from the NVM set belonging to the high priority group. The high priority read resource 511 is a read processing resource allocated to the high priority group.

(2) In a Case where a Read Command to an NVM Set Belonging to the Normal Priority Group is Received The priority control module 122 transmits the read command to the normal priority read circuit 106. The normal priority read circuit 106 is a dedicated read circuit for the normal priority group. The normal priority read circuit 106 uses a normal priority read resource 512 to perform the read process according to the read command. That is, the normal priority read circuit 106 uses the normal priority read resource 512 to read data from the NVM set belonging to the normal priority group. The normal priority read resource 512 is a read processing resource allocated to the normal priority group.

The read process by the high priority read circuit 105 and the read process by the normal priority read circuit 106 are performed in parallel and independently. Thus, the high priority read circuit 105 and the normal priority read circuit 106 have a circuit configuration that does not intervene each other.

(3) In a Case where a Read Command to an NVM Set Belonging to the Low Priority Group is Received The priority control module 122 does not process the read command to the NVM set belonging to the low priority group immediately after receiving it. That is, the priority control module 122 suspends the process of the read command to the NVM set belonging to the low priority group. Specifically, the priority control module 122 transmits the read command to the low priority read command storage 109. The low priority read command storage 109 stores the transmitted read command.

The priority control module 122 may transmit the read command stored in the low priority read command storage 109 to the high priority read circuit 105 or the normal priority read circuit 106 at specific timing. The high priority read circuit 105 or the normal priority read circuit 106 processes the transmitted read command. The specific timing is, for example, a timing at regular time intervals.

Alternatively, the priority control module 122 may transmit the read command stored in the low priority read command storage 109 to the high priority read circuit 105 which is in an idle time. The high priority read circuit 105 is determined to be in the idle time, for example, when the processing amount (for example, the in-processing read data size) is less than a threshold.

Still alternatively, the priority control module 122 may transmit the read command stored in the low priority read command storage 109 to the normal priority read circuit 106 which is in an idle time. The normal priority read circuit 106 is determined to be in the idle time, for example, when the processing amount is less than a threshold.

(4) In a Case where a Write Command to an NVM Set Belonging to the High Priority Group is Received The priority control module 122 transmits the write command to the high priority write circuit 107. The high priority write circuit 107 is a dedicated write circuit for the high priority group. The high priority write circuit 107 uses a high priority write resource 513 to perform the write process according to the write command. That is, the high priority write circuit 107 uses the high priority write resource 513 to write data into the NVM set that belongs to the high priority group. The high priority write resource 513 is a write processing resource allocated to the high priority group.

(5) In a Case where a Write Command to an NVM Set Belonging to the Normal Priority Group is Received The priority control module 122 transmits the write command to the normal priority write circuit 108. The normal priority write circuit 108 is a dedicated write circuit for the normal priority group. The normal priority write circuit 108 uses a normal priority write resource 514 to perform the write process according to the write command. That is, the normal priority write circuit 108 uses the normal priority write resource 514 to write data into the NVM set belonging to the normal priority group. The normal priority write resource 514 is a write processing resource allocated to the normal priority group.

The write process by the high priority write circuit 107 and the write process by the normal priority write circuit 108 are performed in parallel and independently. Thus, the high priority write circuit 107 and the normal priority write circuit 108 have a circuit configuration that does not intervene each other.

(6) In a Case where a Write Command to an NVM Set Belonging to the Low Priority Group is Received The priority control module 122 does not process the write command to the NVM set belonging to the low priority group immediately after receiving it. That is, the priority control module 122 suspends the process of the write command to the NVM set belonging to the low priority group. Specifically, the priority control module 122 transmits the write command to the low priority write command storage 110. The low priority write command storage 110 stores the transmitted write command.

The priority control module 122 may transmit the write command stored in the low priority write command storage 110 to the high priority write circuit 107 or the normal priority write circuit 108 at specific timing. The high priority write circuit 107 or the normal priority write circuit 108 processes the transmitted write command. The specific timing is, for example, timing at regular time intervals.

Alternatively, the priority control module 122 may transmit the write command stored in the low priority write command storage 110 to the high priority write circuit 107 which is in the idle time. The high priority write circuit 107 is determined to be in the idle time, for example, when the processing amount (for example, the in-processing write data size) is less than the threshold.

Still alternatively, the priority control module 122 may transmit the write command stored in the low priority write command storage 110 to the normal priority write circuit 108 which is in an idle time. The normal priority write circuit 108 is determined to be in the idle time, for example, when the processing amount is less than a threshold.

The resource control module 123 controls the allocation of a resource 51 included in the storage device 3.

The resource control module 123 allocates the high priority read resource 511 and the high priority write resource 513 to the high priority group. The high priority read resource 511 is used to process a read command to an NVM set that belongs to the high priority group. The high priority write resource 513 is used to process a write command to an NVM set belonging to the high priority group.

The resource control module 123 allocates the normal priority read resource 512 and the normal priority write resource 514 to the normal priority group. The normal priority read resource 512 is used to process a read command to an NVM set belonging to the normal priority group. The normal priority write resource 514 is used to process a write command to an NVM set belonging to the normal priority group.

The resource control module 123 allocates a resource for the periodic maintenance process to a periodic maintenance resource 516. The resource control module 123 allocates the other resources to a miscellaneous resource 517. The miscellaneous resource 517 is used, for example, for a prefetch process.

The periodic maintenance processing module 124 performs the periodic maintenance process on an NVM set in the NDWIN. At least part of the periodic maintenance resource 516 is used for the periodic maintenance process.

The priority control module 122 may dynamically change the priority group to which each NVM set belongs according to the operation state of the storage device 3. The dynamic change in the priority group guarantees the predictable latency of the read process and the write process on the NVM sets in the DTWIN.

The resource control module 123 may dynamically change the resource allocation according to the operation state of the storage device 3. The dynamic change in the resource allocation guarantees the predictable latency with minimal resources.

Specific examples of the dynamic change in the priority group and the dynamic change in the resource allocation will be described below.

Example 1 of Change in Priority Group/Resource Allocation

The priority control module 122 puts an NVM set for which the operation period of the controller 4 has transitioned to the NDWIN into the low priority group. For example, the priority control module 122 moves an NVM set belonging to the high priority group or the normal priority group for which the operation period of the controller 4 has transitioned from the DTWIN to the NDWIN, to the low priority group. This is for a read process or a write process on an NVM set in the NDWIN not affecting a read process or a write process on an NVM set in the DTWIN.

Further, the priority control module 122 puts an NVM set for which the operation period of the controller 4 has transitioned from the NDWIN to the DTWIN into the high priority group or the normal priority group. For example, the priority control module 122 moves an NVM set belonging to the low priority group for which the operation period of the controller 4 has transitioned from the NDWIN to the DTWIN, back to the high priority group or the normal priority group to which the NVM set belonged before transitioning to the NDWIN.

Example 2 of Change in Priority Group/Resource Allocation

When there is a possibility that an in-processing read data size of the high priority group exceeds an allowable read data size, the priority control module 122 moves at least one of the NVM sets that belong to the high priority group to the normal priority group. Alternatively, when there is a possibility that the in-processing read data size of the high priority group exceeds the allowable read data size, the resource control module 123 allocates part of the normal priority read resource 512 to the high priority read resource 511.

The in-processing read data size of the high priority group is the size of data read by the high priority read circuit 105 from the NVM sets belonging to the high priority group within a certain period of processing.

The allowable read data size of the high priority group is the upper limit of the data size that the high priority read circuit 105 is able to guarantee the predictable latency to read from the NVM sets belonging to the high priority group in the certain period of processing. The allowable read data size of the high priority group changes depending on the amount of allocated high priority read resource 511.

The priority control module 122 and the resource control module 123 are able to acquire the data sizes that are being processed by the high priority read circuit 105, the normal priority read circuit 106, the high priority write circuit 107, and the normal priority write circuit 108, respectively.

For example, when the ratio of the in-processing read data size to the allowable read data size of the high priority group exceeds a threshold (for example, A %), the priority control module 122 and the resource control module 123 determine that there is a possibility that the in-processing read data size of the high priority group exceeds the allowable read data size. Alternatively, when the amount of change per unit time in the in-processing read data size of the high priority group exceeds a threshold, the priority control module 122 and the resource control module 123 determine that there is a possibility that the in-processing read data size of the high priority group exceeds the allowable read data size.

When there is a possibility that an in-processing read data size of the normal priority group exceeds an allowable read data size, the priority control module 122 moves at least one of the NVM sets that belong to the normal priority group to the high priority group. Alternatively, when there is a possibility that the in-processing read data size of the normal priority group exceeds the allowable read data size, the resource control module 123 allocates part of the high priority read resource 511 to the normal priority read resource 512.

The in-processing read data size of the normal priority group is the size of the data read by the normal priority read circuit 106 from the NVM sets belonging to the normal priority group within a certain period of processing.

The allowable read data size of the normal priority group is the upper limit of the data size that the normal priority read circuit 106 is able to guarantee the predictable latency to read from the NVM sets belonging to the normal priority group within the certain period of processing. The allowable read data size of the normal priority group changes depending on the amount of the allocated normal priority read resource 512.

For example, when the ratio of the in-processing read data size to the allowable read data size of the normal priority group exceeds a threshold, the priority control module 122 and the resource control module 123 determine that there is a possibility that the in-processing read data size of the normal priority group exceeds the allowable read data size. Alternatively, when the amount of change per unit time in the in-processing read data size of the normal priority group exceeds a threshold, the priority control module 122 and the resource control module 123 determine that there is a possibility that the in-processing read data size of the normal priority group exceeds the allowable read data size.

When there is a possibility that the in-processing write data size of the high priority group exceeds an allowable write data size, the priority control module 122 moves at least one of the NVM sets that belong to the high priority group to the normal priority group. Alternatively, when there is a possibility that the in-processing write data size of the high priority group exceeds the allowable write data size, the resource control module 123 allocates part of the normal priority write resource 514 to the high priority write resource 513.

The in-processing write data size of the high priority group is the size of the data written by the high priority write circuit 107 to the NVM sets that belong to the high priority group within a certain period of processing.

The allowable write data size of the high priority group is the upper limit of the data size that the high priority write circuit 107 is able to guarantee the predictable latency to write to the NVM sets that belong to the high priority group within the certain period of processing. The allowable write data size of the high priority group changes depending on the amount of allocated high priority write resource 513.

For example, when the ratio of the in-processing write data size to the allowable write data size of the high priority group exceeds a threshold, the priority control module 122 and the resource control module 123 determine that there is a possibility that the in-processing write data size of the high priority group exceeds the allowable write data size. Alternatively, when the amount of change per unit time in the in-processing write data size of the high priority group exceeds a threshold, the priority control module 122 and the resource control module 123 determine that there is a possibility that the in-processing write data size of the high priority group exceeds the allowable write data size.

When there is a possibility that an in-processing write data size of the normal priority group exceeds an allowable write data size, the priority control module 122 moves at least one of the NVM sets that belong to the normal priority group to the high priority group. Alternatively, when there is a possibility that the in-processing write data size of the normal priority group exceeds the allowable write data size, the resource control module 123 allocates part of the high priority write resource 513 to the normal priority write resource 514.

The in-processing write data size of the normal priority group is the size of the data written by the normal priority write circuit 108 to the NVM sets that belong to the normal priority group within a certain period of processing.

The allowable write data size of the normal priority group is the upper limit of the data size that the normal priority write circuit 108 is able to guarantee the predictable latency to write to the NVM sets that belong to the normal priority group within the certain period of processing. The allowable write data size of the normal priority group changes depending on the amount of the allocated normal priority write resource 514.

For example, when the ratio of the in-processing write data size to the allowable write data size of the normal priority group exceeds a threshold, the priority control module 122 and the resource control module 123 determine that there is a possibility that the in-processing write data size of the normal priority group exceeds the allowable write data size. Alternatively, when the amount of change per unit time in the in-processing write data size of the normal priority group exceeds a threshold, the priority control module 122 and the resource control module 123 determine that there is a possibility that the in-processing write data size of the normal priority group exceeds the allowable write data size.

Figure 7:
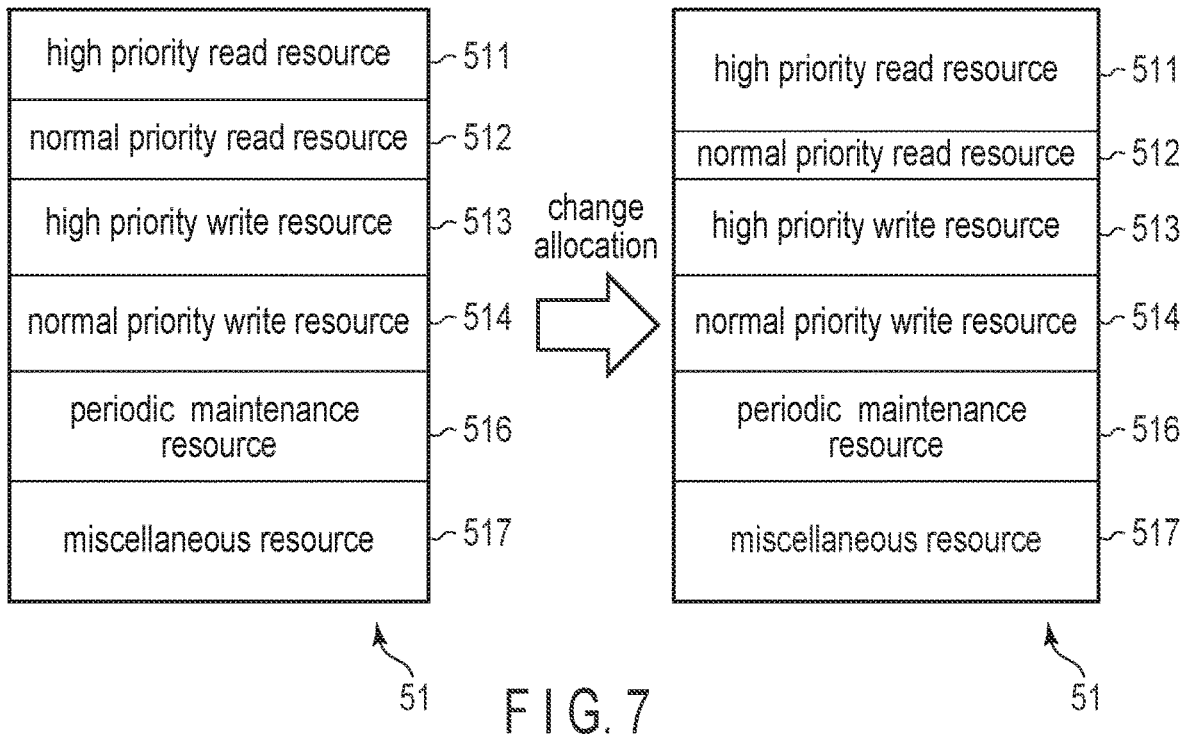
FIG. 7 is a diagram illustrating an example of a change in resource allocation in the storage device according to an embodiment.

FIG. 7 is a diagram illustrating an example of a change in resource allocation in the storage device 3 according to the embodiment. Here, a case in which the resource control module 123 determines that there is a possibility that the in-processing read data size of the high priority group exceeds the allowable read data size and changes the resource allocation will be exemplified.

The resource 51 in the storage device 3 is allocated as the high priority read resource 511, the normal priority read resource 512, the high priority write resource 513, the normal priority write resource 514, the periodic maintenance resource 516 and the miscellaneous resource 517.

When there is a possibility that the in-processing read data size of the high priority group exceeds the allowable read data size, the resource control module 123 allocates part of the normal priority read resource 512 to the high priority read resource 511. As a result, as illustrated in FIG. 7, the high priority read resource 511 increases and the normal priority read resource 512 decreases. Therefore, the allowable read data size of the high priority group increases. The allowable read data size of the normal priority group decreases.

The high priority read circuit 105 uses the increased high priority read resource 511. As a result, the high priority read circuit 105 can respond to a read command to an NVM set that belongs to the high priority group within the maximum command response time. Therefore, the controller 4 can guarantee the predictable latency in the read access to the NVM set belonging to the high priority group.

When there is a possibility that the in-processing read data size of the normal priority group, the in-processing write data size of the high priority group, or the in-processing write data size of the normal priority group exceeds the corresponding allowable data size, the resource control module 123 may change the resource allocation in the same manner. Therefore, the controller 4 can guarantee the predictable latency in the read access to the NVM set belonging to the normal priority group, the write access to the NVM set belonging to the high priority group, and the write access to the NVM set belonging to the normal priority group.

Example 3 of Change in Priority Group/Resource Allocation

When there is a possibility that the in-processing read data size of the high priority group and the in-processing read data size of the normal priority group exceed the corresponding allowable read data size, the resource control module 123 increases the total amount of resource allocated as the high priority read resource 511 and the normal priority read resource 512. Specifically, the resource control module 123 allocates, for example, part of the periodic maintenance resource 516 or miscellaneous resource 517 to at least one of the high priority read resource 511 and the normal priority read resource 512.

Here, an operation example in which the resource control module 123 determines that there is a possibility that both the in-processing read data size of the high priority group and the in-processing read data size of the normal priority group exceed the corresponding allowable read data size will be explained.

First, the resource control module 123 calculates the sum of the allowable read data size of the high priority group and the allowable read data size of the normal priority group. The sum of the allowable read data size of the high priority group and the allowable read data size of the normal priority group is also referred to as the total allowable read data size.

Next, the resource control module 123 calculates the sum of the in-processing read data size of the high priority group and the in-processing read data size of the normal priority group. The sum of the in-processing read data size of the high priority group and the in-processing read data size of the normal priority group is also referred to as the total in-processing read data size.

When the ratio of the total in-processing read data size to the total allowable read data size exceeds a threshold (for example, B %), the resource control module 123 determines that there is a possibility that both the in-processing read data size of the high priority group and the in-processing read data size of the normal priority group exceed the corresponding allowable read data size.

In addition, when there is a possibility that the in-processing write data size of the high priority group and the in-processing write data size of the normal priority group exceed the corresponding allowable write data size, the resource control module 123 increases the total amount of resource allocated as the high priority write resource 513 and the normal priority write resource 514. Specifically, the resource control module 123 allocates, for example, part of the periodic maintenance resource 516 or miscellaneous resource 517 to at least one of the high priority write resource 513 and the normal priority write resource 514.

An operation example in which the resource control module 123 determines that there is a possibility that both the in-processing write data size of the high priority group and the in-processing write data size of the normal priority group exceed the corresponding allowable write data size will be explained.

First, the resource control module 123 calculates the sum of the allowable write data size of the high priority group and the allowable write data size of the normal priority group. The sum of the allowable write data size of the high priority group and the allowable write data size of the normal priority group is also referred to as the total allowable write data size.

Next, the resource control module 123 calculates the sum of the in-processing write data size of the high priority group and the in-processing write data size of the normal priority group. The sum of the in-processing write data size of the high priority group and the in-processing write data size of the normal priority group is also referred to as the total in-processing write data size.

When the ratio of the total in-processing write data size to the total allowable write data size exceeds a threshold, the resource control module 123 determines that there is a possibility that both the in-processing write data size of the high priority group and the in-processing write data size of the normal priority group exceed the corresponding allowable write data size.

Figure 8:
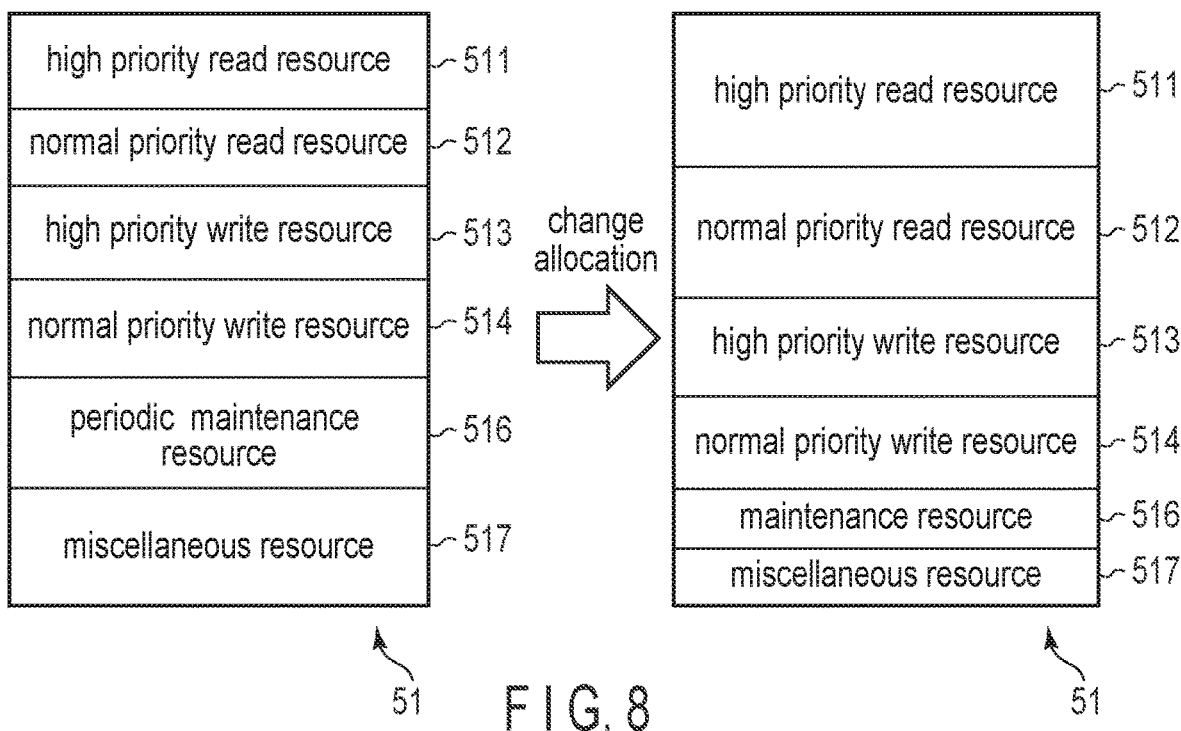
FIG. 8 is a diagram illustrating another example of a change in resource allocation in the storage device according to the embodiment.

FIG. 8 is a diagram illustrating another example of a change in the resource allocation in the storage device 3 according to the embodiment. Here, a case in which the resource control module 123 determines that there is a possibility that both the in-processing read data size of the high priority group and the in-processing read data size of the normal priority group exceed the corresponding allowable read data size and changes the resource allocation will be exemplified.

As previously illustrated, the resource 51 in the storage device 3 is allocated as the high priority read resource 511, the normal priority read resource 512, the high priority write resource 513, the normal priority write resource 514, the periodic maintenance resource 516, and the miscellaneous resource 517.

When there is a possibility that the in-processing read data size of the high priority group and the in-processing read data size of the normal priority group both exceed the corresponding allowable read data size, the resource control module 123 allocates part of the periodic maintenance resource 516 or miscellaneous resource 517 to both the high priority read resource 511 and the normal priority read resource 512. As a result, as illustrated in FIG. 8, the high priority read resource 511 and the normal priority read resource 512 increase, and the periodic maintenance resource 516 miscellaneous resource 517 decreases. Therefore, the allowable read data size of the high priority group increases. The allowable read data size of the normal priority group increases.

The high priority read circuit 105 uses the increased high priority read resource 511. As a result, the high priority read circuit 105 can respond to a read command to an NVM set that belongs to the high priority group within the maximum command response time. Therefore, the controller 4 can guarantee the predictable latency in the read access to the NVM set belonging to the high priority group.

Further, the normal priority read circuit 106 uses the increased normal priority read resource 512. As a result, the normal priority read circuit 106 can respond to a read command to an NVM set that belongs to the normal priority group within the maximum command response time. Therefore, the controller 4 can guarantee the predictable latency in the read access to the NVM set belonging to the normal priority group.

Note that the resource control module 123 may allocate part of the periodic maintenance resource 516 or miscellaneous resource 517 to either the high priority read resource 511 or the normal priority read resource 512.

In addition, when there is a possibility that the in-processing write data size of the high priority group and the in-processing write data size of the normal priority group exceed the corresponding allowable write data size, the resource control module 123 may change the resource allocation in the same way. Therefore, the controller 4 can guarantee the predictable latency in the write access to the NVM set belonging to the high priority group and the write access to the NVM set belonging to the normal priority group.

FIG. 9 is a diagram illustrating a control example of grouping and resource allocation in accordance with the in-processing read data size for each group in the storage device 3 according to the embodiment. FIG. 9 illustrates transitions 310 to 317 of the window and the priority group that correspond to the NVM sets #1 to #8, respectively. In FIG. 9, changes in the time series of an in-processing read data size of the high priority group 321, an in-processing read data size of the normal priority group 322, an allowable read data size of the high priority group 323, and an allowable read data size of the normal priority group 324 are illustrated.

At time t11, the priority control module 122 determines that there is a possibility that the in-processing read data size of the normal priority group 322 exceeds the allowable read data size of the normal priority group 324. Then, the priority control module 122 moves one of the NVM sets belonging to the normal priority group (here, the NVM set #5) to the high priority group. The transition 314 of the NVM set #5 indicates that the NVM set #5 is moved from the normal priority group to the high priority group at time t11. The normal priority read circuit 106 does not process a read command to the moved NVM set #5. Therefore, the in-processing read data size of the normal priority group 322 is reduced. As a result, it is possible to prevent the predictable latency from being unguaranteed in the read access to the NVM sets belonging to the normal priority group.

At time t12, the resource control module 123 determines that there is a possibility that the in-processing read data size of the high priority group 321 exceeds the allowable read data size of the high priority group 323. Then, the resource control module 123 allocates part of the normal priority read resource 512 to the high priority read resource 511. As a result, the allowable read data size of the high priority group 323 increases and the allowable read data size of the normal priority group 324 decreases. Therefore, it is possible to prevent the predictable latency from being unguaranteed in the read access to the NVM sets belonging to the high priority group.

At time t13, the resource control module 123 determines that there is a possibility that the in-processing read data size of the high priority group 321 exceeds the allowable read data size 323, and there is a possibility that the in-processing read data size of the normal priority group 322 exceeds the allowable read data size 324. Then, the resource control module 123 increases the total amount of resource allocated as the high priority read resource 511 and the normal priority read resource 512. The resource control module 123 uses part of the periodic maintenance resource 516 or miscellaneous resource 517 to increase the total amount of resource. More specifically, the resource control module 123 allocates, for example, part of the periodic maintenance resource 516 or miscellaneous resource 517 to the normal priority read resource 512. As a result, the allowable read data size of the normal priority group 324 increases. Therefore, it is possible to prevent the predictable latency from being unguaranteed in the read access to the NVM sets belonging to the normal priority group.

Note that the resource control module 123 may divide part of the periodic maintenance resource 516 or miscellaneous resource 517 and allocate the divided parts to the normal priority read resource 512 and the high priority read resource 511, respectively. As a result of this allocation, the allowable read data size of the normal priority group 324 and the allowable read data size of the high priority group 323 increase. Therefore, it is possible to prevent the predictable latency from being unguaranteed in the read access to the NVM sets belonging to the normal priority group and the high priority group.

At time t14, the resource control module 123 determines that there is no possibility that the in-processing read data size of the normal priority group 322 exceeds the allowable read data size 324. Then, the resource control module 123 restores the total amount of resource allocated as the high priority read resource 511 and the normal priority read resource 512. More specifically, the resource control module 123 returns the part of the resources allocated as the normal priority read resource 512 to the periodic maintenance resource 516 or miscellaneous resource 517 (that is, reallocates the part as the periodic maintenance resource 516 or miscellaneous resource 517). As a result, the total amount of resource used to guarantee the predictable latency in the read access to the NVM sets belonging to the normal priority group and the high priority group can be optimized.

Example 4 of Change in Priority Group/Resource Allocation

When there is a possibility that the in-processing read data size for one NVM set of the high priority group exceeds the allowable read data size of the high priority group, the priority control module 122 moves at least one of the NVM sets other than the one NVM set among all the NVM sets belonging to the high priority group, to the low priority group. More specifically, for example, when the in-processing read data size for the one NVM set of the high priority group exceeds a threshold, the priority control module 122 moves the other NVM sets from the high priority group to the low priority group.

When there is a possibility that the in-processing read data size for one NVM set of the normal priority group exceeds the allowable read data size of the normal priority group, the priority control module 122 moves at least one of the NVM sets other than the one NVM set among all the NVM sets belonging to the normal priority group, to the low priority group. More specifically, for example, when the in-processing read data size for the one NVM set of the normal priority group exceeds a threshold, the priority control module 122 moves the other NVM sets from the normal priority group to the low priority group.

When there is a possibility that the in-processing write data size for one NVM set of the high priority group exceeds the allowable write data size of the high priority group, the priority control module 122 moves at least one of the NVM sets other than the one NVM set among all the NVM sets belonging to the high priority group, to the low priority group. More specifically, for example, when the in-processing write data size for the one NVM set of the high priority group exceeds a threshold, the priority control module 122 moves the other NVM sets from the high priority group to the low priority group.

When there is a possibility that the in-processing write data size for one NVM set of the normal priority group exceeds the allowable write data size of the normal priority group, the priority control module 122 moves at least one of the NVM sets other than the one NVM set among all the NVM sets belonging to the normal priority group, to the low priority group. More specifically, for example, when the in-processing write data size for the one NVM set of the normal priority group exceeds a threshold, the priority control module 122 moves the other NVM sets from the normal priority group to the low priority group.

Figure 10:
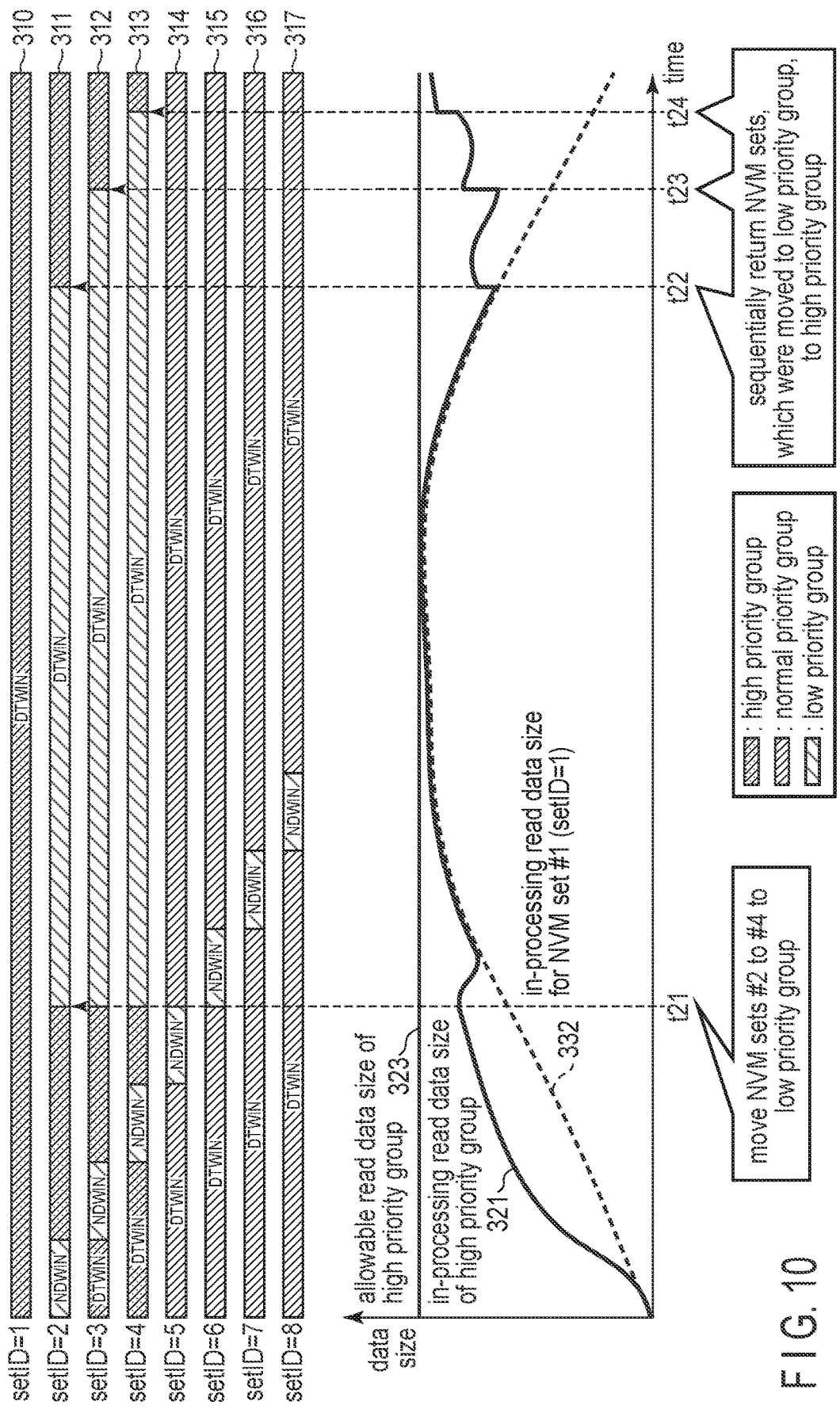
FIG. 10 is a diagram illustrating a control example of grouping in accordance with the in-processing read data size of a high priority group in the storage device according to the embodiment.

FIG. 10 is a diagram illustrating a control example of grouping in accordance with the in-processing read data size of the high priority group in the storage device 3 according to the embodiment. FIG. 10 illustrates transitions 310 to 317 of the window and the priority group that correspond to the NVM sets #1 to #8, respectively. FIG. 10 illustrates the time-series changes in the in-processing read data size of the high priority group 321, the allowable read data size of the high priority group 323, and the in-processing read data size 332 of the NVM set #1.

At time t21, the priority control module 122 determines that there is a possibility that the in-processing read data size 332 of the NVM set #1 belonging to the high priority group exceeds the allowable read data size of the high priority group 323. Then, the priority control module 122 moves the NVM sets #2 to #4, which are the other than the NVM set #1 among all the NVM sets #1 to #4 belonging to the high priority group, to the low priority group. The transitions 311 to 313 of the NVM sets #2 to #4 indicate that the NVM sets #2 to #4 are moved from the high priority group to the low priority group at time t21.

The high priority read circuit 105 does not process a read command to the moved NVM sets #2 to #4. Therefore, the in-processing read data size of the high priority group 321 is reduced. As a result, it is possible to prevent the predictable latency from being unguaranteed in the read access to the NVM set belonging to the high priority group. Note that after moving the NVM sets #2 to #4 to the low priority group, the in-processing read data size of the high priority group 321 matches the in-processing read data size 332 of the NVM set #1.

The amount of data that the high priority read circuit 105 is able to read from the NVM set #1 in the DTWIN is predetermined on the basis of, for example, the DTWIN Read Typical. Therefore, the in-processing read data size 332 of the NVM set #1 decreases over time. When the in-processing read data size 332 of the NVM set #1 has been reduced, and the in-processing read data size of the high priority group 321 (=in-processing read data size 332 of the NVM set #1) is no longer likely to exceed the allowable read data size 323, the priority control module 122 sequentially returns the NVM sets #2 to #4 from the low priority group to the high priority group.

More specifically, at time t22, the priority control module 122 determines that there is no possibility that the in-processing read data size of the high priority group 321 exceeds the allowable read data size 323. Then, the priority control module 122 returns the NVM set #2 from the low priority group to the high priority group. The transition 311 of the NVM set #2 indicates that the NVM set #2 is moved from the low priority group to the high priority group at time t22.

At time t23, the priority control module 122 determines that there is no possibility that the in-processing read data size of the high priority group 321 exceeds the allowable read data size 323. Then, the priority control module 122 returns the NVM set #3 from the low priority group to the high priority group. The transition 312 of the NVM set #3 indicates that the NVM set #3 is moved from the low priority group to the high priority group at time t23.

At time t24, the priority control module 122 determines that there is no possibility that the in-processing read data size of the high priority group 321 exceeds the allowable read data size 323. Then, the priority control module 122 returns the NVM set #4 from the low priority group to the high priority group. The transition 313 of the NVM set #4 indicates that the NVM set #4 is moved from the low priority group to the high priority group at time t24.

By the operation of the priority control module 122 illustrated in FIG. 10 above, in the read access to an NVM set with a very large in-processing read data size, it is possible to prevent the predictable latency from being unguaranteed.

Example 5 of Change in Priority Group/Resource Allocation

The resource control module 123 may dynamically adjust the amount of the periodic maintenance resource 516. When there is a possibility that the periodic maintenance processing module 124 is not able to complete the periodic maintenance process for an NVM set in the NDWIN, the resource control module 123 increases the amount of the periodic maintenance resource 516. Due to the increase in the amount of the periodic maintenance resource 516, the periodic maintenance processing module 124 can complete the periodic maintenance process for the NVM set in the NDWIN.

Figures 11, 12, 13:
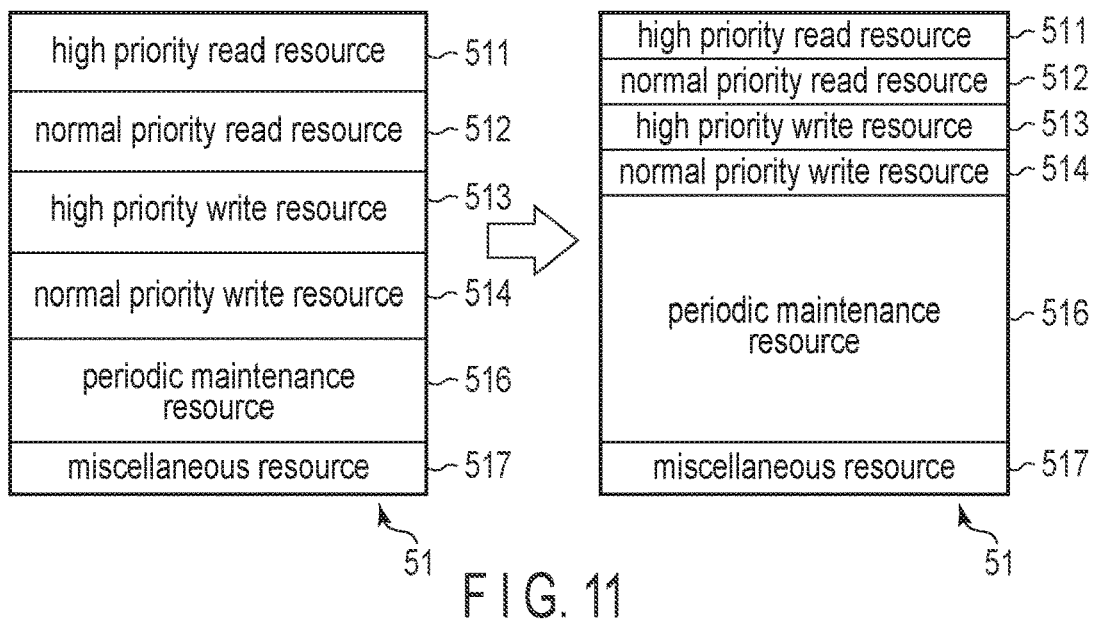
FIG. 11 is a diagram illustrating still another example of a change in resource allocation in the storage device according to the embodiment.
FIG. 12 is a diagram illustrating a configuration example of an NVM set versus priority management table used in the storage device according to the embodiment.
FIG. 13 is a diagram illustrating a configuration example of a priority versus resource management table used by the storage device according to the embodiment.

FIG. 11 is a diagram illustrating still another example of a change in the resource allocation in the storage device 3 according to the embodiment. Here, a case in which the resource control module 123 determines that there is a possibility that the periodic maintenance process for an NVM set is not completed within the NDWIN, and increases the amount of the periodic maintenance resource 516.

As previously illustrated, the resource 51 in the storage device 3 is allocated as the high priority read resource 511, the normal priority read resource 512, the high priority write resource 513, the normal priority write resource 514, the periodic maintenance resource 516, and the miscellaneous resource 515.

The resource control module 123 calculates the amount of resource required to complete the periodic maintenance process for an NVM set within the NDWIN when the operation period of the controller 4 on the NVM set has transitioned to the NDWIN. The calculated amount of resource is based on the periodic maintenance process scheduled for the NVM set. When the current amount of the periodic maintenance resource 516 is less than the calculated amount of resource, the resource control module 123 determines that there is a possibility that the periodic maintenance process for the NVM set is not completed within the NDWIN. The resource control module 123 allocates part of the high priority read resource 511, the normal priority read resource 512, the high priority write resource 513, or the normal priority write resource 514 to the periodic maintenance resource 516. As a result, as illustrated in FIG. 11, the high priority read resource 511, the normal priority read resource 512, the high priority write resource 513, or the normal priority write resource 514 decrease, and the periodic maintenance resource 516 increases.

The periodic maintenance processing module 124 uses the increased periodic maintenance resource 516. As a result, the periodic maintenance processing module 124 can complete the periodic maintenance process for the NVM set within the NDWIN. Therefore, the controller 4 can realize, for example, the Predictable Latency Mode of the NVMe standard.

Next, a method of managing the priority group to which an NVM set belongs will be described. The priority control module 122 uses, for example, the NVM set versus priority management table 22 to manage the priority group to which the NVM set belongs.

FIG. 12 is a diagram illustrating a configuration example of the NVM set versus priority management table 22 used in the storage device 3 according to the embodiment. The NVM set versus priority management table 22 includes entries. The entries correspond to NVM sets respectively. Each of the entries includes fields of a setID, a default priority group, and a current priority group.

The information indicated by each field in the entry corresponding to one NVM set is described.

The setID field indicates identification information of the corresponding NVM set.

The default priority group field indicates the priority group to which the corresponding NVM set is initially distributed. The distributed priority group is based on the maximum command response time corresponding to the NVM set.

The current priority group field indicates the priority group to which the corresponding NVM set is currently distributed.

The priority control module 122 determines, for example, a priority group into which the NVM set is distributed in the initial setting. The priority control module 122 sets information indicative of the determined priority group to the default priority group field and the current priority group field. When moving the NVM set from one priority group to another priority group, the priority control module 122 sets information indicative of the priority group into which the NVM set is to be moved to the current priority group field.

Next, a method of managing the amount of resource allocated to each of the high and normal priority groups will be described. The resource control module 123 uses, for example, the priority versus resource management table 23 to manage the allocation of the resource amount.

FIG. 13 is a diagram illustrating a configuration example of the priority versus resource management table 23 used in the storage device 3 according to the embodiment. The priority versus resource management table 23 includes entries. The entries correspond to priority groups, respectively. The priority groups are groups (for example, the high priority group and the normal priority group) that guarantee the predictable latency. Each of the entries includes fields of a priority group, a default read resource amount, a current read resource amount, an allowable read data size, a default write resource amount, a current write resource amount, and an allowable write data size.

The information indicated by each field in the entry corresponding to one priority group is described.

The priority group field indicates the corresponding priority group.

The default read resource amount field indicates an initial value of the amount of read resource allocated to the corresponding priority group.

The current read resource amount field indicates the amount of read resource currently allocated to the corresponding priority group.

The allowable read data size field indicates the current allowable read data size of the corresponding group.

The default write resource amount field indicates an initial value of the amount of write resource allocated to the corresponding priority group.

The current write resource amount field indicates the amount of write resource currently allocated to the corresponding priority group.

The allowable write data size field indicates the current allowable write data size of the corresponding group.

The resource control module 123 determines the read resource amount to be allocated to one priority group, for example, at the initial setting. The resource control module 123 sets the determined read resource amount to the default read resource amount field and the current read resource amount field. Then, the resource control module 123 sets the allowable read data size based on the determined read resource amount to the allowable read data size field.

When the read resource allocation is to be changed for a priority group, the resource control module 123 sets the changed resource amount to the current read resource amount field in the entry corresponding to the priority group. Then, the resource control module 123 sets the allowable read data size based on the changed resource amount to the allowable read data size field.

Further, the resource control module 123 determines the amount of write resource to be allocated to one priority group, for example, at the initial setting. The resource control module 123 sets the determined write resource amount to the default write resource amount field and the current write resource amount field. Then, the resource control module 123 sets the allowable write data size based on the determined write resource amount to the allowable write data size field.

When the write resource allocation is to be changed for a priority group, the resource control module 123 sets the changed resource amount to the current write resource amount field in the entry corresponding to the priority group. Then, the resource control module 123 sets the allowable write data size based on the changed resource amount to the allowable write data size field.

The priority control module 122 and the resource control module 123 may determine the operation state of the storage device 3 using the priority versus resource management table 23 and the data sizes that are being processed by the high priority read circuit 105, the normal priority read circuit 106, the high priority write circuit 107, and the normal priority write circuit 108, respectively. The priority control module 122 and the resource control module 123 determines as the operation state of the storage device 3, for example, whether there is a possibility that the in-processing read data size of the high priority group exceeds the allowable read data size. The resource control module 123 may dynamically change the resource allocation on the basis of the determination. In addition, the priority control module 122 may dynamically change the grouping of the NVM sets on the basis of the determination.

Figure 14A:
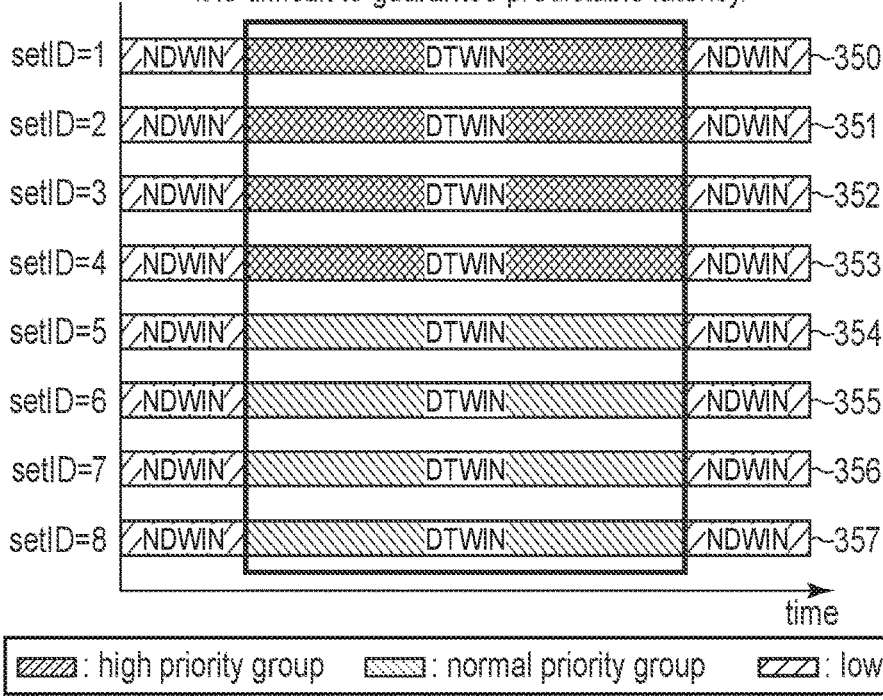
FIG. 14A is a diagram illustrating an example of timing at which an operation period of a controller on each of NVM sets transitions between the DTWIN and the NDWIN.

FIG. 14A is a diagram illustrating an example of timing at which the operation period of the controller 4 on an NVM set transitions between the DTWIN and the NDWIN. FIG. 14A illustrates window transitions 350 to 357 that correspond to the NVM sets #1 to #8, respectively.

The window transitions 350 to 357 indicate that the operation periods of the controller 4 on all the NVM sets #1 to #8 transition from the NDWIN to the DTWIN at the same time. As the number of NVM sets in the DTWIN increases, it is more difficult for the controller 4 to guarantee the predictable latency for the read access and the write access from the host 2. Therefore, it is very difficult for the controller 4 to guarantee the predictable latency when all the NVM sets #1 to #8 are in the DTWIN.

For this reason, in the storage device 3 of the present embodiment, the window control module 121 may adjust the timing at which the operation period of the controller 4 on an NVM set transitions from the NDWIN to the DTWIN. The window control module 121 limits the number of NVM sets that are in the DTWIN at the same time by adjusting the transition timing.

More specifically, the window control module 121 selects one NVM set for which the operation period of the controller 4 is able to transition from the NDWIN to the DTWIN. The selection of NVM set is performed, for example, at regular intervals. When the number of NVM sets in the DTWIN is less than a threshold, the window control module 121 transitions the operation period of the controller 4 on the selected NVM set to the DTWIN. When the number of NVM sets in the DTWIN is equal to or greater than the threshold, the window control module 121 does not transition the operation period of the controller 4 on the selected NVM set to the DTWIN. Therefore, the operation period of the controller 4 on the selected NVM set remains in the NDWIN until the number of NVM sets in the DTWIN becomes less than the threshold.

Figure 14B:
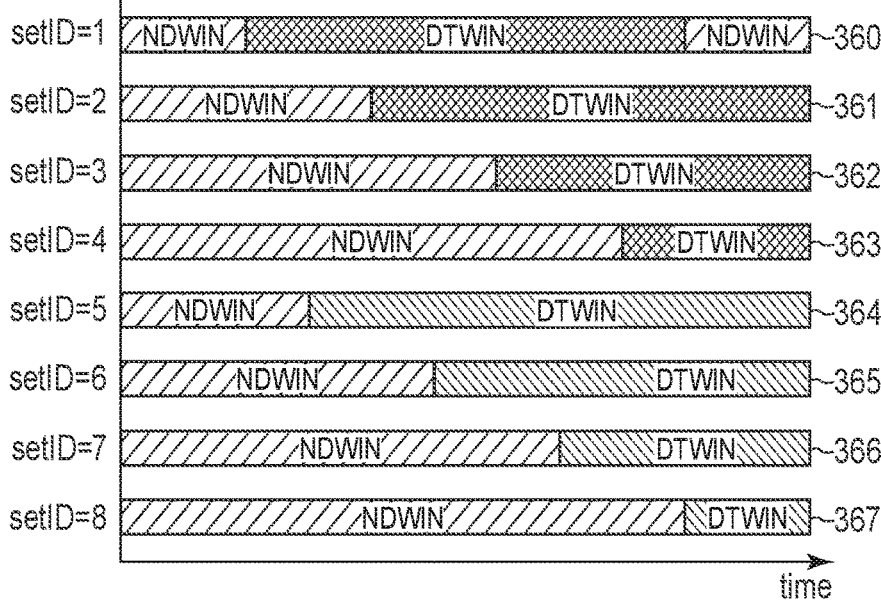
FIG. 14B is a diagram illustrating another example of timing at which an operation period of the controller on each of NVM sets in the storage device according to the embodiment transitions between the DTWIN and the NDWIN.

FIG. 14B is a diagram illustrating another example of timing at which the operation period of the controller 4 on an NVM set in the storage device 3 according to the embodiment transitions between the DTWIN and the NDWIN. FIG. 14B illustrates window transitions 360 to 367 that correspond to the NVM sets #1 to #8, respectively. In the window transitions 360 to 367, the number of NVM sets in the DTWIN is limited to seven.

The window control module 121 limits the number of NVM sets in the DTWIN, that is, the number of NVM sets for which the predictable latency is guaranteed, to be less than the threshold by controlling the transition timing. Therefore, it is easy for the controller 4 to guarantee the predictable latency.

Figure 15:
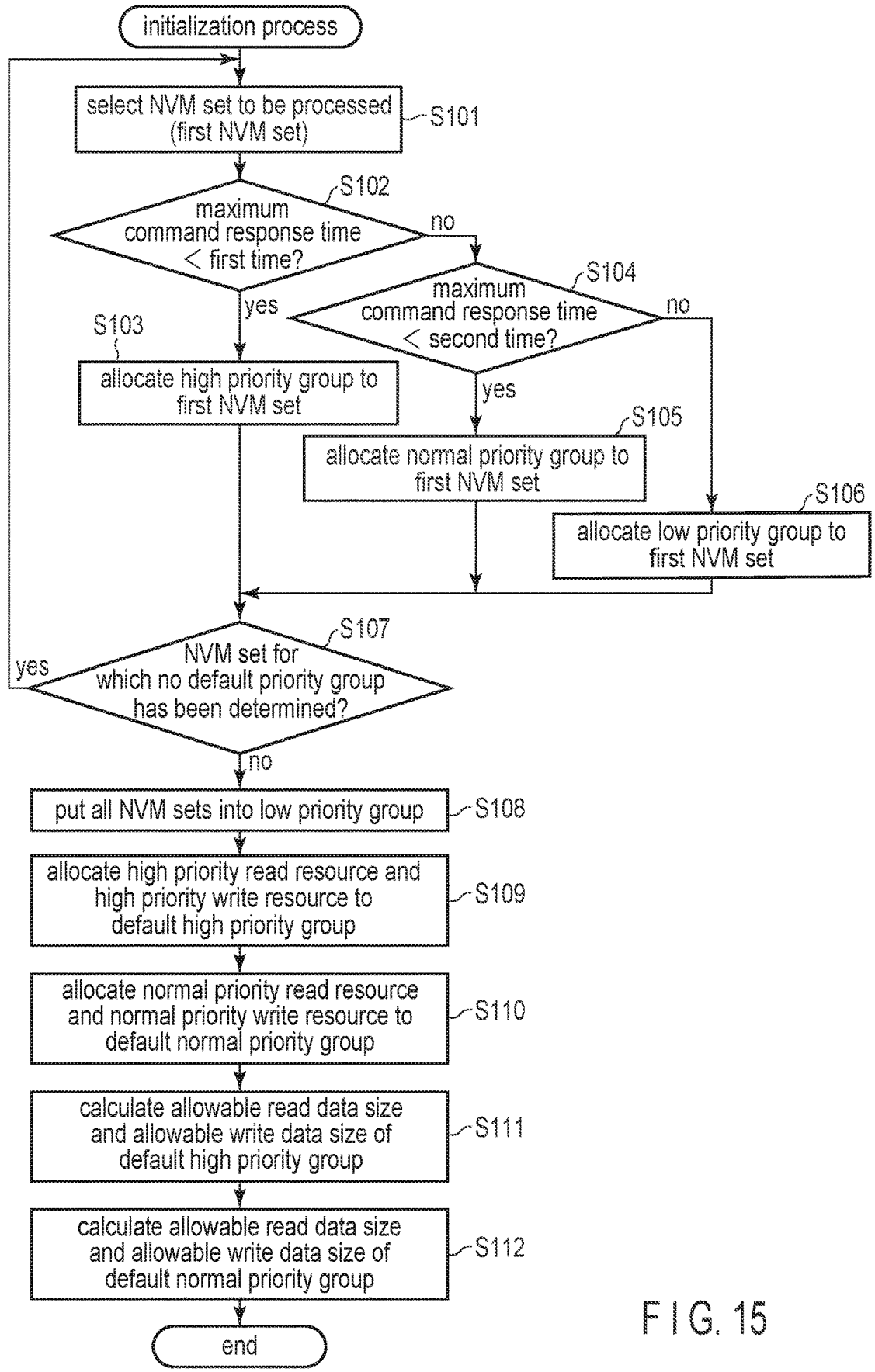
FIG. 15 is a flowchart illustrating an example of the procedure of an initialization process executed by a CPU in the storage device according to the embodiment.

FIG. 15 is a flowchart illustrating an example of the procedure of an initialization process executed by the CPU 102 in the storage device 3 according to the embodiment. The CPU 102 executes the initialization process, for example, in response to the start of the storage device 3. In the initialization process, the CPU 102 determines a group to be allocated to each NVM set as one of the high priority group, the normal priority group, and the low priority group. It is assumed that the operation period of the controller 4 is the NDWIN for all NVM sets while the initialization process is executed.

The CPU 102 selects an NVM set to be processed (hereinafter referred to as a first NVM set) from the NVM sets (S101). Each of the NVM sets includes some of memory areas obtained by logically dividing the memory area of the nonvolatile memory 5.

The CPU 102 determines whether the maximum response time (maximum command response time) for a command to the first NVM set (more specifically, a read command or a write command) is less than a first time (S102). When the maximum command response time is less than the first time (yes in S102), the CPU 102 allocates the high priority group to the first NVM set (S103). That is, the default priority group of the first NVM set is the high priority group. Then, the CPU 102 advances the process to S107.

When the maximum command response time is more than or equal to the first time (no in S102), the CPU 102 advances the process to S104.

The CPU 102 determines whether the maximum command response time is less than a second time (S104). The second time is larger than the first time. When the maximum command response time is less than the second time (yes in S104), the CPU 102 allocates the normal priority group to the first NVM set (S105). That is, the default priority group of the first NVM set is the normal priority group. Then, the CPU 102 advances the process to S107.

When the maximum command response time is more than or equal to the second time (no in S102), the CPU 102 allocates the low priority group to the first NVM set (S106). That is, the default priority group of the first NVM set is the low priority group. Then, the CPU 102 advances the process to S107.

The CPU 102 then determines whether there is an NVM set for which no default priority group has been determined (S107). When there is an NVM set for which no default priority group has been determined (yes in S107), the CPU 102 advances the process to S101. That is, the CPU 102 further determines the default priority group to be allocated to the NVM set for which the default priority group has not been determined.

When there is no NVM set for which no default priority group has been determined (no in S107), that is, when the default priority group has been determined to each of all the NVM sets, the CPU 102 puts the current priority group of all the NVM sets into the low priority group (S108). This is because the operation period of the controller 4 on all the NVM sets is the NDWIN.

Then, the CPU 102 allocates the high priority read resource 511 and the high priority write resource 513 to the default high priority group (S109). The CPU 102 allocates the normal priority read resource 512 and the normal priority write resource 514 to the default normal priority group (S110).

The CPU 102 then calculates the allowable read data size and allowable write data size of the default high priority group (S111). More specifically, the CPU 102 calculates the allowable read data size of the default high priority group on the basis of, for example, the amount of the high priority read resource 511. The CPU 102 calculates the allowable write data size of the default high priority group on the basis of, for example, the amount of the high priority write resource 513.

The CPU 102 calculates the allowable read data size and allowable write data size of the default normal priority group (S112). More specifically, the CPU 102 calculates the allowable read data size of the default normal priority group on the basis of, for example, the amount of normal priority read resource 512. The CPU 102 calculates the allowable write data size of the default normal priority group on the basis of, for example, the amount of the normal priority write resource 514. Then, the CPU 102 ends the initialization process (end).

Through the initialization process, the CPU 102 can determine the default priority group allocated to each of the NVM sets. In response to the transition of the operation period of the controller 4 on an NVM set from the NDWIN to the DTWIN, the CPU 102 may move the current priority group of the NVM set from the low priority group to the priority group allocated in the initialization process (that is, the default priority group). Further, the CPU 102 can allocate a read resource and a write resource to each of the high and normal priority groups.

FIG. 16 is a flowchart illustrating an example of the procedure of a first change process executed by the CPU 102 in the storage device 3 according to the embodiment. The first change process is a process for dealing with a situation that the in-processing read data size of one NVM set belonging to the high priority group or the normal priority group is very large. The CPU 102 executes the first change process at regular intervals, for example.

The CPU 102 determines whether the high priority group includes an NVM set whose in-processing read data size exceeds a first threshold (S201). When the high priority group includes an NVM set whose in-processing read data size exceeds the first threshold (yes in S201), the CPU 102 moves the other NVM sets in the high priority group to the low priority group (S202). In other words, the CPU 102 moves at least one of the NVM sets other than the NVM set whose in-processing read data size exceeds the first threshold among all NVM sets that belong to the high priority group, to the low priority group. Then, the CPU 102 advances the process to S203.

When the high priority group does not include an NVM set whose in-processing read data size exceeds the first threshold (no in S201), the CPU 102 advances the process to S203.

The CPU 102 then determines whether the normal priority group includes an NVM set whose in-processing read data size exceeds a second threshold (S203). When the normal priority group includes an NVM set whose in-processing read data size exceeds the second threshold (yes in S203), the CPU 102 moves the other NVM sets in the normal priority group to the low priority group (S204). In other words, the CPU 102 moves the at least one of the NVM sets other than the NVM set whose in-processing read data size exceeds the second threshold among all NVM sets that belong to the normal priority group, to the low priority group. Then, the CPU 102 ends the first change process (end).

When the normal priority group does not include an NVM set whose in-processing read data size exceeds the second threshold (no in S203), the CPU 102 ends the first change process (end).

In the first change process, the CPU 102 moves at least one of the NVM sets in the high priority group other than the NVM set whose in-processing read data size exceeds the first threshold, to the low priority group. As a result, the CPU 102 can guarantee the predictable latency in the read access to the NVM set that is included in the high priority group and whose in-processing read data size exceeds the first threshold.

In addition, the CPU 102 moves at least one of the NVM sets in the normal priority group other than the NVM set whose in-processing read data size exceeds the second threshold, to the low priority group. As a result, the CPU 102 can guarantee the predictable latency in the read access to the NVM set that is included in the normal priority group and whose in-processing read data size exceeds the second threshold.

Note that the CPU 102 may execute a process similar to the first change process using the write data size. That is, the CPU 102 may execute a process in which the read data size illustrated in the flowchart of FIG. 16 is replaced with the write data size.

In such a process, the CPU 102 moves at least one of the NVM sets in the high priority group other than the NVM set whose current write data size exceeds the first threshold, to the low priority group. As a result, the CPU 102 can guarantee the predictable latency in the write access to the NVM set that is included in the high priority group and whose current write data size exceeds the first threshold.

Further, in such a process, the CPU 102 moves at least one of the NVM sets in the normal priority group other than the NVM set whose current write data size exceeds the second threshold, to the low priority group. As a result, the CPU 102 can guarantee the predictable latency in the write access to the NVM set that is included in the normal priority group and whose current write data size exceeds the second threshold.

Figure 17:
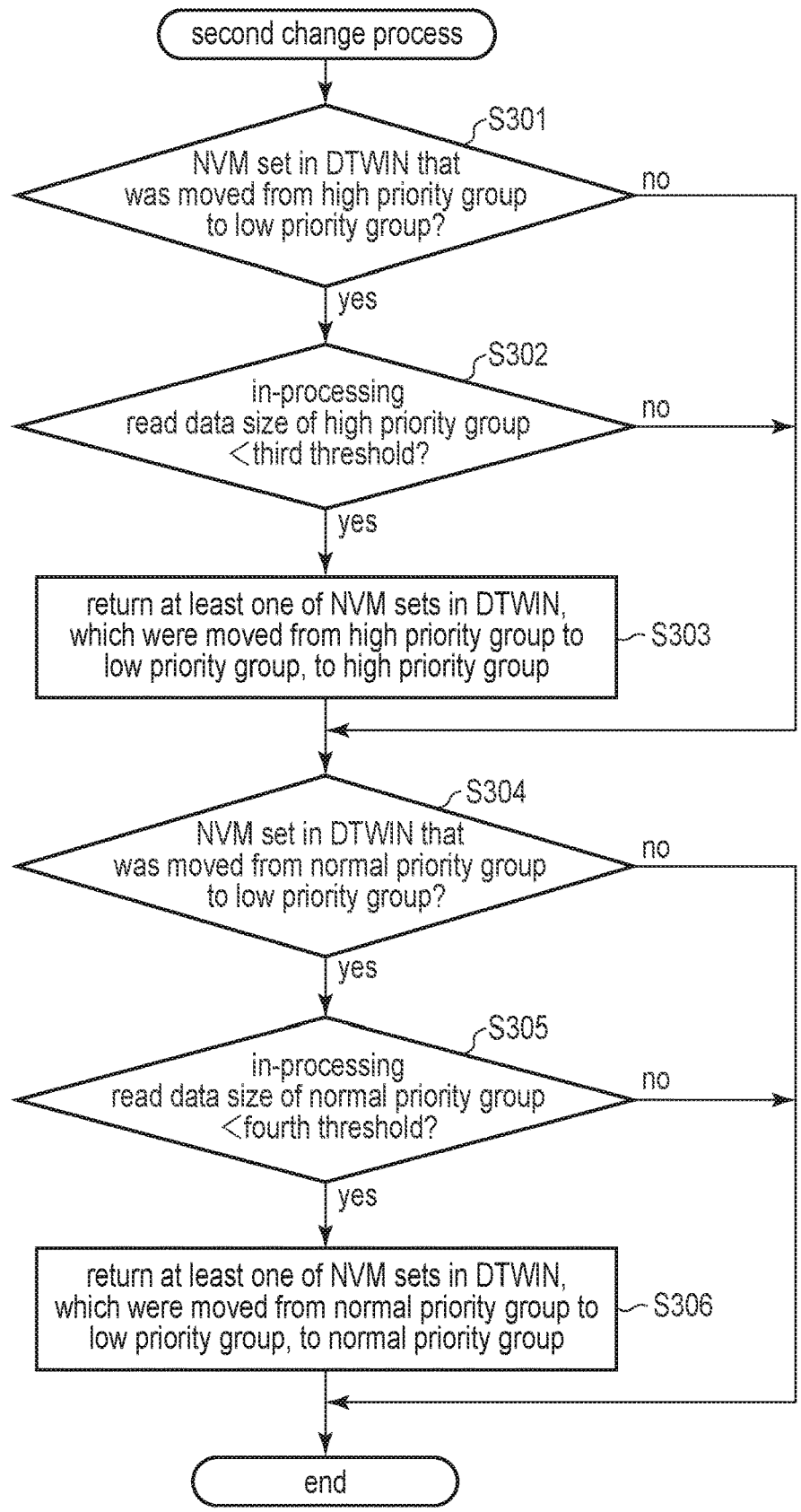
FIG. 17 is a flowchart illustrating an example of the procedure of a second change process executed by the CPU in the storage device according to the embodiment.

FIG. 17 is a flowchart illustrating an example of the procedure of a second change process executed by the CPU 102 in the storage device 3 according to the embodiment. The second change process is a process of returning an NVM set that was moved from the high priority group or the normal priority group to the low priority group in the first change process to the previous group. After executing the first change process, the CPU 102 executes the second change process at regular intervals, for example.

The CPU 102 determines whether there is an NVM set in the DTWIN that was moved from the high priority group to the low priority group (S301). In other words, the CPU 102 determines whether there is an NVM set in the DTWIN that was moved from the high priority group to the low priority group to deal with another NVM set that has a very large in-processing read data size.

When there is no NVM set in the DTWIN that was moved from the high priority group to the low priority group (no in S301), the CPU 102 advances the process to S304.

When there is an NVM set in the DTWIN that was moved from the high priority group to the low priority group (yes in S301), the CPU 102 determines whether the in-processing read data size of the high priority group is less than a third threshold (S302).

When the in-processing read data size of the high priority group is less than the third threshold (yes in S302), the CPU 102 returns at least one of the NVM sets in the DTWIN, which were moved from the high priority group to the low priority group, to the high priority group (S303). Then, the CPU 102 advances the process to S304.

When the in-processing read data size of the high priority group is greater than or equal to the third threshold (no in S302), the CPU 102 advances the process to S304. In other words, when the in-processing read data size of the NVM set belonging to the high priority group has not decreased yet, the NVM set in the DTWIN, which was moved from the high priority group to the low priority group, is not returned to the high priority group.

The CPU 102 then determines whether there is an NVM set in the DTWIN that was moved from the normal priority group to the low priority group (S304). In other words, the CPU 102 determines whether there is an NVM set in the DTWIN that was moved from the normal priority group to the low priority group to deal with another NVM set that has a very large in-processing read data size.

When there is no NVM set in the DTWIN that was moved from the normal priority group to the low priority group (no in S304), the CPU 102 ends the second change process (end).

When there is an NVM set in the DTWIN that was moved from the normal priority group to the low priority group (yes in S304), the CPU 102 determines whether the in-processing read data size of the normal priority group is less than a fourth threshold (S305).

When the in-processing read data size of the normal priority group is less than the fourth threshold (yes in S305), the CPU 102 returns at least one of the NVM sets in the DTWIN, which were moved from the normal priority group to the low priority group, to the normal priority group (S306). Then, the CPU 102 ends the second change process (end).

When the in-processing read data size of the normal priority group is greater than or equal to the fourth threshold (no in S305), the CPU 102 ends the second change process (end). In other words, when the in-processing read data size for the NVM set belonging to the normal priority group has not decreased yet, the NVM set in the DTWIN, which was moved from the normal priority group to the low priority group, is not returned to the normal priority group.

In the second change process, when the in-processing read data size for the NVM set that belongs to the high priority group (that is, the NVM set that caused the at least one of the other NVM sets to move from the high priority group to the low priority group) decreases, the CPU 102 returns an NVM set in the DTWIN, which was moved from the high priority group to the low priority group, to the high priority group. Therefore, the CPU 102 can guarantee the predictable latency in the read access to the NVM set returned from the low priority group to the high priority group.

When the in-processing read data size for the NVM set that belongs to the normal priority group (that is, the NVM set that caused the at least one of the other NVM sets to move from the normal priority group to the low priority group) decreases, the CPU 102 returns an NVM set in the DTWIN, which was moved from the normal priority group to the low priority group, to the normal priority group. Therefore, the CPU 102 can guarantee the predictable latency in the read access to the NVM set returned from the low priority group to the normal priority group.

Note that the CPU 102 can execute a process similar to the second change process using the write data size. That is, the CPU 102 can execute a process in which the read data size illustrated in the flowchart of FIG. 17 is replaced with the write data size.

In such a process, when the in-processing write data size for the NVM set that belongs to the high priority group (that is, the NVM set that caused the at least one of the other NVM sets to move from the high priority group to the low priority group) decreases, the CPU 102 returns an NVM set in the DTWIN, which was moved from the high priority group to the low priority group, to the high priority group. Therefore, the CPU 102 can guarantee the predictable latency in the write access to the NVM set returned from the low priority group to the high priority group.

Further, in such a process, when the in-processing write data size for the NVM set that belongs to the normal priority group (that is, the NVM set that caused the at least one of the other NVM sets to move from the normal priority group to the low priority group) decreases, the CPU 102 returns an NVM set in the DTWIN, which was moved from the normal priority group to the low priority group, to the normal priority group. Therefore, the CPU 102 can guarantee the predictable latency in the write access to the NVM set returned from the low priority group to the normal priority group.

Figure 18:
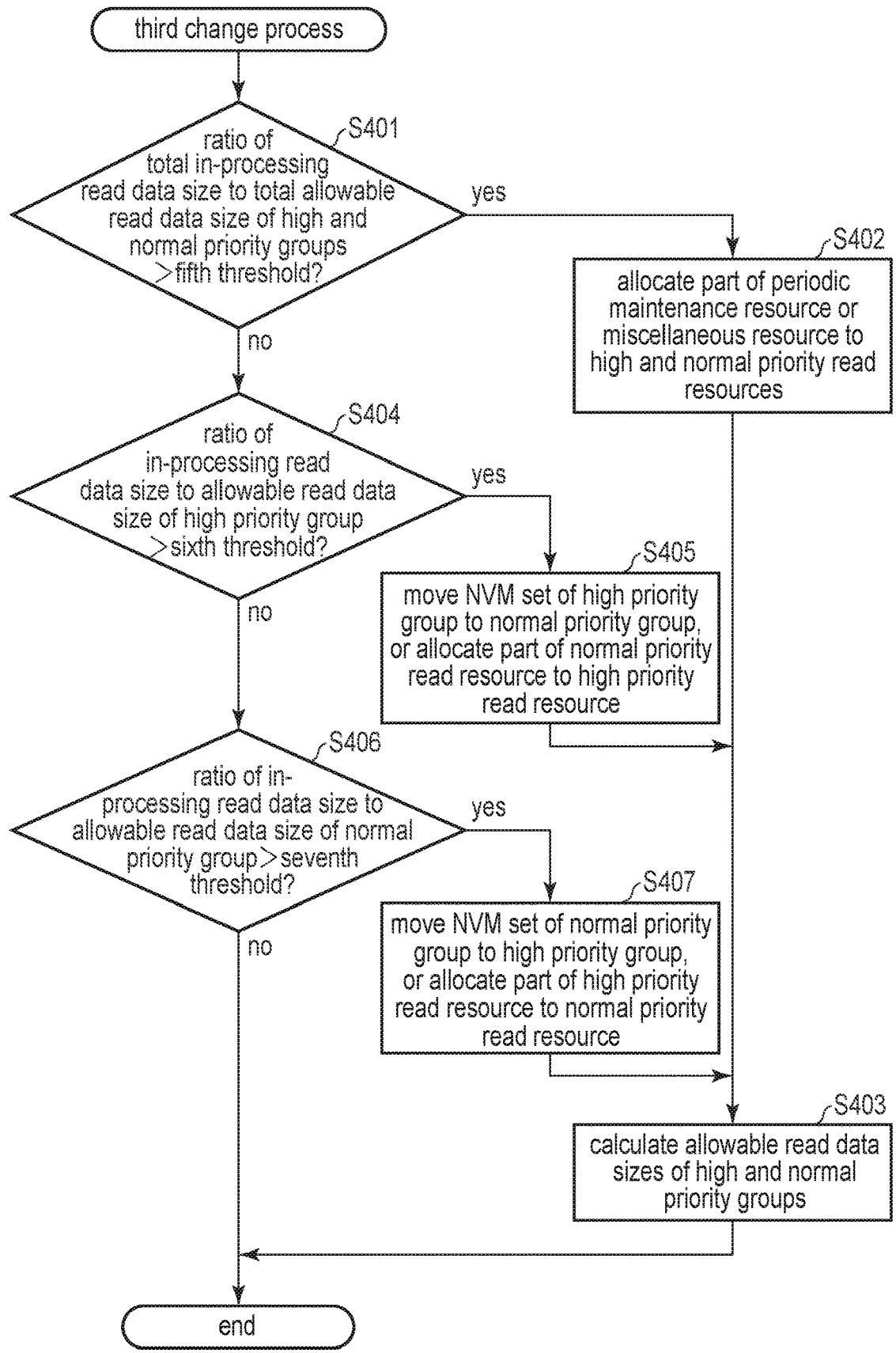
FIG. 18 is a flowchart illustrating an example of the procedure of a third change process executed by the CPU in the storage device according to the embodiment.

FIG. 18 is a flowchart illustrating an example of the procedure of a third change process executed by the CPU 102 in the storage device 3 according to the embodiment. The third change process is a process of changing the grouping or resource allocation in accordance with the in-processing read data size. The CPU 102 executes the third change process at regular intervals, for example.

The CPU 102 determines whether the ratio of the total in-processing read data size to the total allowable read data size exceeds a fifth threshold (S401). The total allowable read data size is the sum of the allowable read data size of the high priority group and the allowable read data size of the normal priority group. The total in-processing read data size is the sum of the in-processing read data size of the high priority group and the in-processing read data size of the normal priority group.

When the ratio of the total in-processing read data size to the total allowable read data size exceeds the fifth threshold (yes in S401), the CPU 102 allocates part of the periodic maintenance resource 516 or miscellaneous resource 517 to the high priority read resource 511 and the normal priority read resource 512 (S402). The CPU 102 may allocate the part of the periodic maintenance resource 516 or miscellaneous resource 517 to either the high priority read resource 511 or the normal priority read resource 512. Then, the CPU 102 calculates the allowable read data size of the high priority group and the allowable read data size of the normal priority group (S403). That is, the CPU 102 updates the allowable read data sizes of both groups in response to the change in resource allocation in S402. Then, the CPU 102 ends the third change process (end).

When the ratio of the total in-processing read data size to the total allowable read data size is less than or equal to the fifth threshold (no in S401), the CPU 102 determines whether the ratio of the in-processing read data size to the allowable read data size of the high priority group exceeds a sixth threshold (S404).

When the ratio of the in-processing read data size to the allowable read data size of the high priority group exceeds the sixth threshold (yes in S404), the CPU 102 moves at least one NVM set belonging to the high priority group to the normal priority group or allocates part of the normal priority read resource 512 to the high priority read resource 511 (S405). Then, the CPU 102 calculates the allowable read data size of the high priority group and the allowable read data size of the normal priority group (S403). Note that the CPU 102 does not have to calculate the allowable read data sizes when the NVM set is moved from the high priority group to the normal priority group in S405. Then, the CPU 102 ends the third change process (end).

When the ratio of the in-processing read data size to the allowable read data size of the high priority group is less than or equal to the sixth threshold (no in S404), the CPU 102 determines whether the ratio of the in-processing read data size to the allowable read data size of the normal priority group exceeds a seventh threshold (S406).

When the ratio of the in-processing read data size to the allowable read data size of the normal priority group exceeds the seventh threshold (yes in S406), the CPU 102 moves at least one NVM set belonging to the normal priority group to the high priority group or allocates part of the high priority read resource 511 to the normal priority read resource 512 (S407). Then, the CPU 102 calculates the allowable read data size of the high priority group and the allowable read data size of the normal priority group (S403). Note that the CPU 102 does not have to calculate the allowable read data sizes when the NVM set is moved from the normal priority group to the high priority group in S407. Then, the CPU 102 ends the third change process (end).

In the third change process, the CPU 102 changes the grouping or resource allocation in accordance with at least one of an increase in the in-processing read data size of high priority group and an increase in the in-processing read data size of the normal priority group. More specifically, the CPU 102 either moves an NVM set that belongs to the group with the increasing in-processing read data size to another group, or allocates further a resource to the group with the increasing in-processing read data size. As a result, since the number of NVM sets that belong to the group decreases, or the allocated resource increases, the CPU 102 can guarantee the predictable latency in the read access to each NVM set belonging to the high priority group and the normal priority group.

Note that the CPU 102 can execute a process similar to the third change process using the write data size. That is, the CPU 102 may execute a process in which the read data size illustrated in the flowchart of FIG. 18 is replaced with the write data size and the read resource is replaced with the write resource.

In such a process, the CPU 102 changes the grouping or resource allocation in accordance with at least one of an increase in the in-processing write data size of the high priority group and an increase in the in-processing write data size of the normal priority group. More specifically, the CPU 102 moves an NVM set that belongs to the group with the increasing in-processing write data size to another group. This reduces the number of NVM sets that belong to the group. Alternatively, the CPU 102 allocates further a resource to the group with the increasing in-processing write data size. This increases the resource allocated to the group. By the grouping or changing resource allocation, the CPU 102 can guarantee the predictable latency in the write access to each NVM set belonging to the high priority group and the normal priority group.

Figure 19:
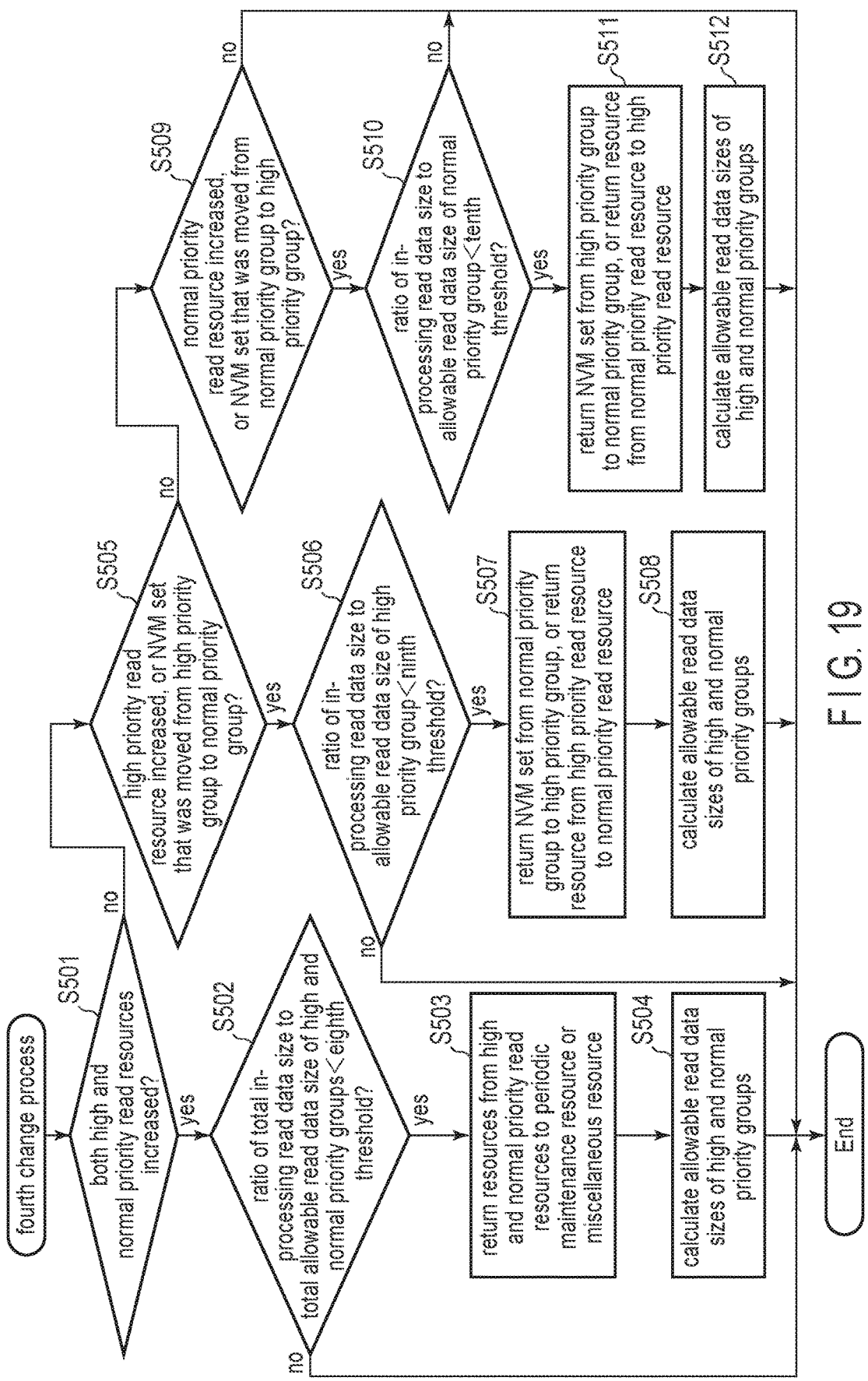
FIG. 19 is a flowchart illustrating an example of the procedure of a fourth change process executed by the CPU in the storage device according to the embodiment.

FIG. 19 is a flowchart illustrating an example of the procedure of a fourth change process executed by the CPU 102 in the storage device 3 according to the embodiment. The fourth change process is a process for restoring the grouping or the resource allocation changed in the third change process. After executing the third change process, the CPU 102 executes the fourth change process at regular intervals, for example.

The CPU 102 determines whether both the high priority read resource 511 and the normal priority read resource 512 have been increased (S501). That is, the CPU 102 determines whether part of the periodic maintenance resource 516 or miscellaneous resource 517 is being allocated to the high priority read resource 511 and the normal priority read resource 512. The CPU 102 uses, for example, the priority versus resource management table 23 to determine whether part of the periodic maintenance resource 516 or miscellaneous resource 517 is being allocated to the high priority read resource 511 and the normal priority read resource 512.

When both the high priority read resource 511 and the normal priority read resource 512 have been increased (yes in S501), the CPU 102 determines whether the ratio of the total in-processing read data size to the total allowable read data size is less than an eighth threshold (S502).

When the ratio of the total in-processing read data size to the total allowable read data size is less than the eighth threshold (yes in S502), the CPU 102 returns part of the periodic maintenance resource 516 or miscellaneous resource 517, which is allocated to the high priority read resource 511 and the normal priority read resource 512, to the periodic maintenance resource 516 or miscellaneous resource 517 (S503). Then, the CPU 102 calculates the allowable read data size of the high priority group and the allowable read data size of the normal priority group (S504). That is, the CPU 102 updates the allowable read data size of the high priority group and the allowable read data size of the normal priority group in response to the change in the resource allocation in S503. Then, the CPU 102 ends the fourth change process (end).

When the ratio of the total in-processing read data size to the total allowable read data size is equal to or greater than the eighth threshold (no in S502), the CPU 102 ends the fourth change process (end). Therefore, when the total in-processing read data size is still large, part of the periodic maintenance resource 516 or miscellaneous resource 517 continues to be allocated to the high priority read resource 511 and the normal priority read resource 512.

When at least one of the high priority read resource 511 and the normal priority read resource 512 has not been increased (no in S501), the CPU 102 determines whether h the high priority read resource 511 has been increased, or there is an NVM set that was moved from the high priority group to the normal priority group (S505). The CPU 102 uses, for example, the priority versus resource management table 23 to determine whether the high priority read resource 511 has been increased. The CPU 102 uses, for example, the NVM set versus priority management table 22 to determine whether there is an NVM set that was moved from the high priority group to the normal priority group.

When the high priority read resource 511 has been increased, or there is an NVM set that was moved from the high priority group to the normal priority group (yes in S505), the CPU 102 determines whether the ratio of the in-processing read data size to the allowable read data size of the high priority group is less than a ninth threshold (S506).

When the ratio of the in-processing read data size to the allowable read data size of the high priority group is less than the ninth threshold (yes in S506), the CPU 102 returns the NVM set, which was moved from the high priority group to the normal priority group, to the high priority group, or returns part of the normal priority read resource 512, which is allocated to the high priority read resource 511, to the normal priority read resource 512 (S507). Then, the CPU 102 calculates the allowable read data size of the high priority group and the allowable read data size of the normal priority group (S508). Note that when the NVM set is returned from the normal priority group to the high priority group in S507, the CPU 102 does not have to calculate the allowable read data size of the high priority group and the allowable read data size of the normal priority group. Then, the CPU 102 ends the fourth change process (end).

When the ratio of the in-processing read data size to the allowable read data size in the high priority group is equal to or greater than the ninth threshold (no in S506), the CPU 102 ends the fourth change process (end). Therefore, when the in-processing read data size of the high priority group is still large, part of the normal priority read resource 512 continues to be allocated to the high priority read resource 511.

When the high priority read resource 511 has not been increased, and there is no NVM set that was moved from the high priority group to the normal priority group (no in S505), the CPU 102 determines whether the normal priority read resource 512 has been increased, or there is an NVM set that was moved from the normal priority group to the high priority group (S509). The CPU 102 uses, for example, the priority versus resource management table 23 to determine whether the normal priority read resource 512 has been increased. The CPU 102 uses, for example, the NVM set versus priority management table 22 to determine whether there is an NVM set that was moved from the normal priority group to the high priority group.

When the normal priority read resource 512 has been increased, or there is an NVM set that was moved from the normal priority group to the high priority group (yes in S509), the CPU 102 determines whether the ratio of the in-processing read data size to the allowable read data size of the normal priority group is less than a tenth threshold (S510).

When the ratio of the in-processing read data size to the allowable read data size of the normal priority group is less than the tenth threshold (yes in S510), the CPU 102 returns the NVM set, which was moved from the normal priority group to the high priority group, to the normal priority group, or returns part of the high priority read resource 511, which is allocated to the normal priority read resource 512, to the high priority read resource 511 (S511). Then, the CPU 102 calculates the allowable read data size of the high priority group and the allowable read data size of the normal priority group (S512). Note that when the NVM set is returned from the high priority group to the normal priority group in S511, the CPU 102 does not have to calculate the allowable read data size of the high priority group and the allowable read data size of the normal priority group. Then, the CPU 102 ends the fourth change process (end).

When the ratio of the in-processing read data size to the allowable read data size of the normal priority group is equal to or greater than the tenth threshold (no in S510), the CPU 102 ends the fourth change process (end). Therefore, when the in-processing read data size in the normal priority group is still large, part of the high priority read resource 511 continues to be allocated to the normal priority read resource 512.

When the normal priority read resource 512 has not been increased, and there is no NVM set that was moved from the normal priority group to the high priority group (no in S509), the CPU 102 ends the fourth change process (end).

In the fourth change process, when the total in-processing read data size of the high priority group and the normal priority group decreases, the CPU 102 can return part of the periodic maintenance resource 516 or miscellaneous resource 517, which is allocated to the high priority read resource 511 and the normal priority read resource 512, to the periodic maintenance resource 516 or miscellaneous resource 517. When the in-processing read data size of the high priority group decreases, the CPU 102 can return an NVM set from the normal priority group to the high priority group, or return part of the normal priority read resource 512, which is allocated to the high priority read resource 511, to the normal priority read resource 512. In addition, when the in-processing read data size of the normal priority group decreases, the CPU 102 can return an NVM set from the high priority group to the normal priority group. Alternatively, when the in-processing read data size of the normal priority group decreases, the CPU 102 can return part of the high priority read resource 511, which is allocated to the normal priority read resource 512, to the high priority read resource 511.

Note that the CPU 102 may execute a process similar to the fourth change process using the write data size. That is, the CPU 102 may execute a process in which the read data size illustrated in the flowchart of FIG. 19 is replaced with the write data size and the read resource is replaced with the write resource.

In such a process, when the total in-processing write data size of the high priority group and the normal priority group decreases, the CPU 102 can return part of the periodic maintenance resource 516 or miscellaneous resource 517, which is allocated to the high priority write resource 513 and the normal priority write resource 514, to the periodic maintenance resource 516 or miscellaneous resource 517. When the in-processing write data size of the high priority group decreases, the CPU 102 can return an NVM set from the normal priority group to the high priority group, or return part of the normal priority write resource 514, which is allocated to the high priority write resource 513, to the normal priority write resource 514. In addition, when the in-processing write data size of the normal priority group decreases, the CPU 102 can return an NVM set from the high priority group to the normal priority group. Alternatively, when the in-processing write data size of the normal priority group decreases, the CPU 102 can return part of the high priority write resource 513, which is allocated to the normal priority write resource 514, to the high priority write resource 513.

Figure 20:
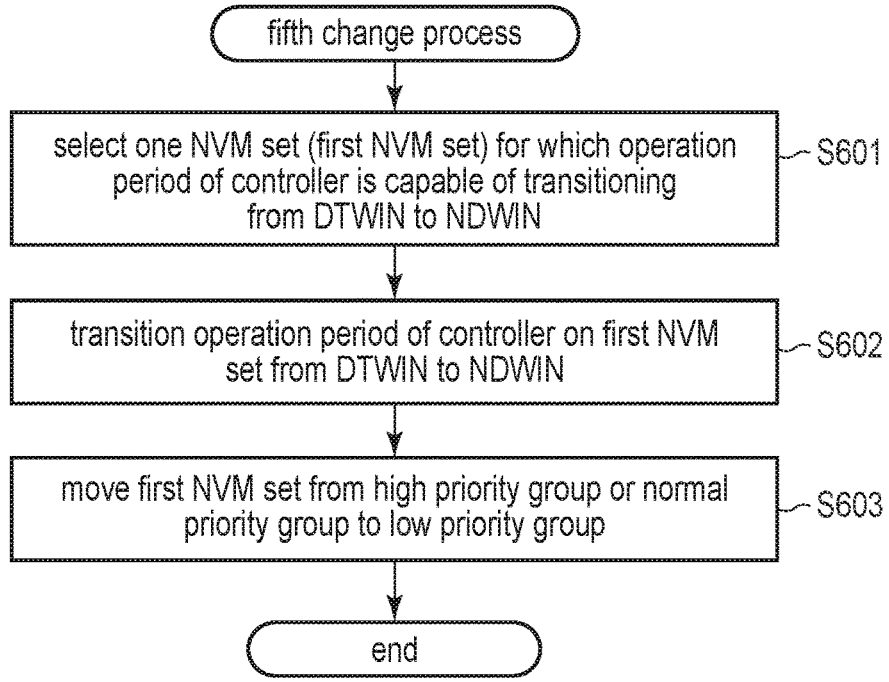
FIG. 20 is a flowchart illustrating an example of the procedure of a fifth change process executed by the CPU in the storage device according to the embodiment.

FIG. 20 is a flowchart illustrating an example of the procedure of a fifth change process executed by the CPU 102 in the storage device 3 according to the embodiment. The fifth change process is a process of changing, in accordance with the transition of the operation period of the controller 4 from the DTWIN to the NDWIN, the grouping of the corresponding NVM set. The CPU 102 executes the fifth change process, for example, when the operation period of the controller 4 on an NVM set is capable of transitioning from the DTWIN to the NDWIN. The NVM set for which the operation period of the controller 4 is capable of transitioning from the DTWIN to the NDWIN is, for example, an NVM set of which the host 2 requests to transition from the DTWIN to the NDWIN.

The CPU 102 selects one NVM set (hereinafter referred to as a first NVM set) for which the operation period of the controller 4 is capable of transitioning from the DTWIN to the NDWIN from the NVM sets in the storage device 3 (S601). The CPU 102 transitions the operation period of the controller 4 on the first NVM set from the DTWIN to the NDWIN (S602). The CPU 102 moves the first NVM set from the high priority group or the normal priority group to which the first NVM set currently belongs to the low priority group (S603).

In the fifth change process, the CPU 102 can transition the operation period of the controller 4 of an NVM set from the DTWIN to the NDWIN, and move the NVM set from the high priority group or the normal priority group to the low priority group.

Figure 21:
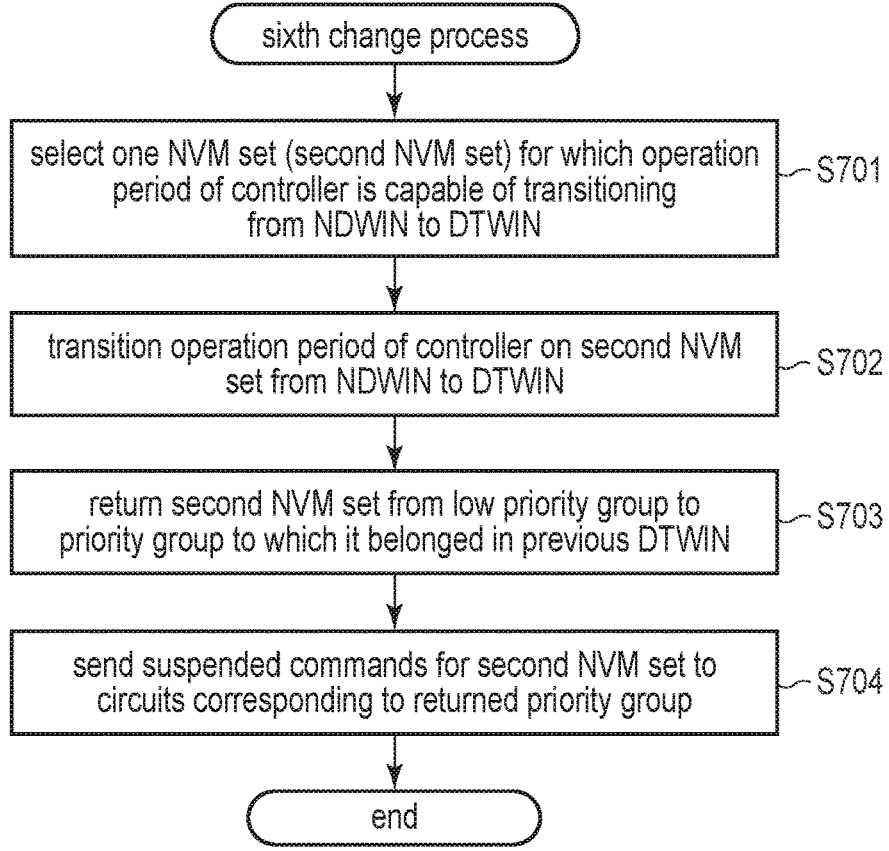
FIG. 21 is a flowchart illustrating an example of the procedure of a sixth change process executed by the CPU in the storage device according to the embodiment.

FIG. 21 is a flowchart illustrating an example of the procedure of a sixth change process executed by the CPU 102 in the storage device 3 according to the embodiment. The sixth change process is a process of changing, in accordance with the transition of the operation period of the controller 4 from the NDWIN to the DTWIN, the grouping of the corresponding NVM set. The CPU 102 executes the sixth change process, for example, when the operation period of the controller 4 on an NVM set is capable of transitioning from the NDWIN to the DTWIN.

The CPU 102 selects one NVM set (hereinafter referred to as a second NVM set) for which the operation period of the controller 4 is capable of transitioning from the NDWIN to the DTWIN, from the NVM sets in the storage device 3 (S701). The CPU 102 transitions the operation period of the controller 4 on the second NVM set from the NDWIN to the DTWIN (S702).

The CPU 102 then returns the second NVM set from the low priority group to the priority group to which it belonged in the previous DTWIN (S703). More specifically, when the second NVM set belonged to the high priority group in the previous DTWIN, the CPU 102 returns the second NVM set from the low priority group to the high priority group. When the second NVM set belonged to the normal priority group in the previous DTWIN, the CPU 102 returns the second NVM set from the low priority group to the normal priority group.

Then, the CPU 102 sends a read command or a write command, which targets on the second NVM set and has been suspended, to the read circuit or the write circuit corresponding to the returned group, respectively (S704). More specifically, when the second NVM set is returned to the high priority group, the CPU 102 sends a read command, which targets on the second NVM set and has been suspended, to the high priority read circuit 105. When the second NVM set is returned to the high priority group, the CPU 102 sends a write command, which targets on the second NVM set and has been suspended, to the high priority write circuit 107. When the second NVM set is returned to the normal priority group, the CPU 102 sends a read command, which targets on the second NVM set and has been suspended, to the normal priority read circuit 106. When the second NVM set is returned to the normal priority group, the CPU 102 sends a write command, which targets on the second NVM set and has been suspended, to the normal priority write circuit 108. The read command, which targets on the second NVM set, is suspended using, for example, the low priority read command storage 109. The write command, which targets on the second NVM set, is suspended using, for example, the low priority write command storage 110.

In the sixth change process, the CPU 102 can transition the operation period of the controller 4 on an NVM set from the NDWIN to the DTWIN, and return the NVM set from the low priority group to the high priority group or the normal priority group. The CPU 102 sends a read command, which has been suspended and targets on the NVM set for which the operation period of the controller 4 has transitioned from the NDWIN to the DTWIN, to the high priority read circuit 105 or the normal priority read circuit 106. The CPU 102 sends a write command, which has been suspended and targets on the NVM set for which the operation period of the controller 4 has transitioned from the NDWIN to the DTWIN, to the high priority write circuit 107 or the normal priority write circuit 108. Therefore, the CPU 102 can resume the process of the suspended read command and the suspended write command.

Figure 22:
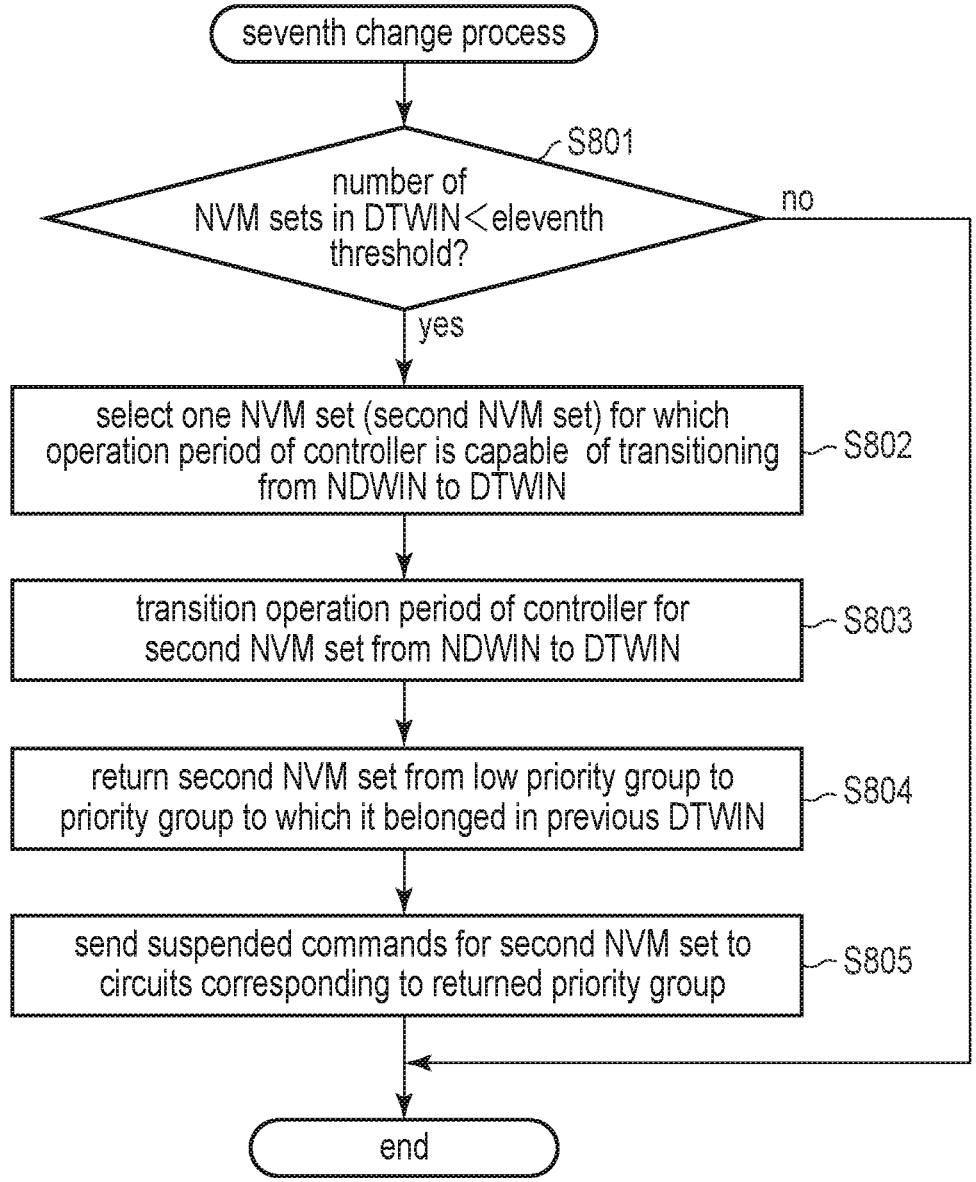
FIG. 22 is a flowchart illustrating an example of the procedure of a seventh change process executed by the CPU in the storage device according to the embodiment.

FIG. 22 is a flowchart illustrating an example of the procedure of a seventh change process executed by the CPU 102 in the storage device 3 according to the embodiment. The seventh change process is another example of the process of changing the grouping of an NVM set according to the transition from the NDWIN to the DTWIN. The CPU 102 may execute the seventh change process instead of the sixth change process.

The CPU 102 determines whether the number of NVM sets in the DTWIN among the NVM sets in the storage device 3 is less than an eleventh threshold (S801).

When the number of NVM sets in the DTWIN is less than the eleventh threshold (yes in S801), the CPU 102 selects, from NVM sets, one NVM set (hereinafter referred to as a second NVM set) for which the operation period of the controller 4 is capable of transitioning from the NDWIN to the DTWIN (S802). The CPU 102 transitions the operation period of the controller 4 on the second NVM set from the NDWIN to the DTWIN (S803).

The CPU 102 then returns the second NVM set from the low priority group to the priority group to which the second NVM set belonged in the previous DTWIN (S804). The CPU 102 sends a read command or a write command, which targets on the second NVM set and has been suspended, to the read circuit or the write circuit corresponding to the returned priority group, respectively (S805). Then, the CPU 102 ends the seventh change process (end).

When the number of NVM sets in the DTWIN is greater than or equal to the eleventh threshold (no in S801), the CPU 102 ends the seventh change process (end).

In the seventh change process, the CPU 102 can control, in accordance with the number of NVM sets in the DTWIN, timing at which the operation period of the controller 4 on the second NVM set transitions from the NDWIN to the DTWIN. This allows the CPU 102 to limit the number of NVM sets to be in the DTWIN. Therefore, the CPU 102 can easily guarantee the predictable latency in the read access and the write access to the NVM sets in the DTWIN.

FIG. 23 is a flowchart illustrating an example of the procedure of an eighth change process executed by the CPU 102 in the storage device 3 according to the embodiment. The eighth change process is a process of securing a required amount of the periodic maintenance resource 516. The CPU 102 executes the eighth change process at regular intervals, for example. The CPU 102 may execute the eighth change process according to the transition of the operation period of the controller 4 on an NVM set from the DTWIN to the NDWIN.

The CPU 102 calculates the amount of the periodic maintenance resource 516 required by at least one NVM set in the NDWIN (S901). The amount of the periodic maintenance resource 516 is the amount of resource required to complete the periodic maintenance process on the NVM set within the NDWIN. The CPU 102 determines whether the current amount of the periodic maintenance resource 516 is less than the calculated amount of the periodic maintenance resource (S902).

When the current amount of the periodic maintenance resource 516 is less than the calculated amount of the periodic maintenance resource (yes in S902), the CPU 102 allocates part of the high priority read resource 511, the normal priority read resource 512, the high priority write resource 513, and the normal priority write resource 514 to the periodic maintenance resource 516 (S903). The CPU 102 allocates, for example, certain amounts of resource or certain percentages of resource as the periodic maintenance resource 516 from the high priority read resource 511, the normal priority read resource 512, the high priority write resource 513, and the normal priority write resource 514, respectively. Note that the CPU 102 may allocate part of at least one of the high priority read resource 511, the normal priority read resource 512, the high priority write resource 513, and the normal priority write resource 514 to the periodic maintenance resource 516. Then, the CPU 102 ends the eighth change process (end).

When the current amount of the periodic maintenance resource 516 is equal to or greater than the calculated amount of the periodic maintenance resource (no in S902), the CPU 102 determines whether the periodic maintenance resource 516 has a surplus resource that is allocated from the high priority read resource 511, the normal priority read resource 512, the high priority write resource 513, and the normal priority write resource 514 (S904). In other words, the CPU 102 determines whether the periodic maintenance resource 516 includes a resource that becomes surplus after allocated from the high priority read resource 511, the normal priority read resource 512, the high priority write resource 513, and the normal priority write resource 514.

When there is a surplus resource (yes in S904), the CPU 102 returns the surplus resource to the high priority read resource 511, the normal priority read resource 512, the high priority write resource 513, and the normal priority write resource 514 (S905). Then, the CPU 102 ends the eighth change process (end).

When there is no surplus resource (no in S904), the CPU 102 ends the eighth change process (end).

In the eighth change process, the CPU 102 can allocate part of the high priority read resource 511, the normal priority read resource 512, the high priority write resource 513, and the normal priority write resource 514 to the periodic maintenance resource 516 so that it is possible to secure the amount of the periodic maintenance resource 516 required by the NVM set in the NDWIN. In addition, when there is a surplus in the allocated periodic maintenance resource 516, the CPU 102 can return the surplus resource to the high priority read resource 511, the normal priority read resource 512, the high priority write resource 513, and the normal priority write resource 514.

FIG. 24 is a flowchart illustrating an example of the procedure of a read command control process executed by the CPU 102 in the storage device 3 according to the embodiment. The read command control process is a process of controlling a read operation in accordance with a read command received from the host 2. The CPU 102 executes the read command control process in response to, for example, receiving the read command.

The CPU 102 specifies an NVM set on which the read command received from the host 2 targets (S1001). Specifically, the CPU 102 uses a namespace identifier included in the read command to specify a namespace on which the read command targets. The CPU 102 specifies the NVM set that includes the identified namespace. Then, the CPU 102 branches the process in accordance with the priority group to which the specified NVM set belongs (S1002). The CPU 102 may use, for example, the NVM set versus priority management table 22 to determine the priority group to which the specified NVM set belongs.

When the specified NVM set belongs to the high priority group (high priority group in S1002), the CPU 102 sends the read command to the high priority read circuit 105 (S1003). Then, the CPU 102 ends the read command control process (end). The high priority read circuit 105 processes the sent read command by using the high priority read resource 511.

When the specified NVM set belongs to the normal priority group (normal priority group in S1002), the CPU 102 sends the read command to the normal priority read circuit 106 (S1004). Then, the CPU 102 ends the read command control process (end). The normal priority read circuit 106 processes the sent read command by using the normal priority read resource 512.

When the specified NVM set belongs to the low priority group (low priority group of S1002), the CPU 102 stores the read command to the low priority read command storage 109 (S1005). That is, the CPU 102 uses the low priority read command storage 109 to suspend the process of the read command. Then, the CPU 102 determines whether the time having elapsed since a read command stored in the low priority read command storage 109 was previously processed exceeds a twelfth threshold (S1006).

When the elapsed time exceeds the twelfth threshold (yes in S1006), the CPU 102 selects a circuit to process a read command from the high priority read circuit 105 and the normal priority read circuit 106 (S1007). The CPU 102 selects, for example, a circuit of a priority group having a smaller in-processing read data size from the high priority read circuit 105 and the normal priority read circuit 106. Alternatively, the CPU 102 may select a circuit of a priority group whose in-processing read data size does not exceed a threshold from the high priority read circuit 105 and the normal priority read circuit 106. When the in-processing read data size does not exceed the threshold in both the high priority group and the normal priority group, the circuit selected immediately before may be preferentially selected. The CPU 102 sends the read command to the selected circuit (S1008). Then, the CPU 102 ends the read command control process (end).

When the elapsed time does not exceed the twelfth threshold (no in S1006), the CPU 102 determines whether the number of read commands stored in the low priority read command storage 109 exceeds a thirteenth threshold (S1009).

When the number of read commands stored in the low priority read command storage 109 exceeds the thirteenth threshold (yes in S1009), the CPU 102 selects the circuit to process the read command from the high priority read circuit 105 and the normal priority read circuit 106 (S1007). The CPU 102 sends the read command to the selected circuit (S1008). Then, the CPU 102 ends the read command control process (end).

When the number of read commands stored in the low priority read command storage 109 does not exceed the thirteenth threshold (no in S1009), the CPU 102 ends the read command control process (end).

In the read command control process, the CPU 102 executes a process according to the priority group to which an NVM set of the read command target belongs. Specifically, when an NVM set on which the read command targets belongs to the high priority group or the normal priority group, the CPU 102 causes the corresponding dedicated read circuit (that is, the high priority read circuit 105 or the normal priority read circuit 106) to process the read command. As a result, the CPU 102 can guarantee the predictable latency in the read access to the NVM set belonging to the high priority group and the normal priority group.

When the NVM set on which the read command targets belongs to the low priority group, the CPU 102 suspends the read command. The CPU 102 causes the high priority read circuit 105 or the normal priority read circuit 106 to process the suspended command at specific timing. Therefore, there is a possibility that the CPU 102 cannot guarantee the predictable latency in the read access to the NVM set that belongs to the low priority group.

FIG. 25 is a flowchart illustrating an example of the procedure of a write command control process executed by the CPU 102 in the storage device 3 according to the embodiment. The write command control process is a process of controlling a write operation in accordance with a write command received from the host 2. The CPU 102 executes the write command control process in response to, for example, receiving the write command.

The CPU 102 specifies an NVM set on which the write command received from the host 2 targets (S1101). Specifically, the CPU 102 uses a namespace identifier included in the write command to specify a namespace on which the write command targets. The CPU 102 identifies the NVM set that contains the specified namespace. Then, the CPU 102 branches the process in accordance with the priority group to which the specified NVM set belongs (S1102). The CPU 102 may use, for example, the NVM set versus priority management table 22 to determine the priority group to which the specified NVM set belongs.

When the specified NVM set belongs to the high priority group (high priority group in S1102), the CPU 102 sends the write command to the high priority write circuit 107 (S1103). Then, the CPU 102 ends the write command control process (end). The high priority write circuit 107 processes the sent write command by using the high priority write resource 513.

When the specified NVM set belongs to the normal priority group (normal priority group in S1102), the CPU 102 sends the write command to the normal priority write circuit 108 (S1104). Then, the CPU 102 ends the write command control process (end). The normal priority write circuit 108 processes the sent write command by using the normal priority write resource 514.

When the specified NVM set belongs to the low priority group (low priority group of S1102), the CPU 102 stores the write command in the low priority write command storage 110 (S1105). That is, the CPU 102 uses the low priority write command storage 110 to suspend the process of the write command. Then, the CPU 102 determines whether the time having elapsed since a write command stored in the low priority write command storage 110 was previously processed exceeds a fourteenth threshold (S1106).

When the elapsed time exceeds the fourteenth threshold (yes in S1106), the CPU 102 selects a circuit to process a write command from the high priority write circuit 107 and the normal priority write circuit 108 (S1107). The CPU 102 selects, for example, a circuit of a priority group having a smaller in-processing write data size from the high priority write circuit 107 and the normal priority write circuit 108. Alternatively, the CPU 102 may select a circuit of a priority group whose in-processing write data size does not exceed a threshold from the high priority write circuit 107 and the normal priority write circuit 108. When the in-processing write data size does not exceed the threshold in both the high priority group and the normal priority group, the circuit selected immediately before may be preferentially selected. The CPU 102 sends the write command to the selected circuit (S1108). Then, the CPU 102 ends the write command control process (end).

When the elapsed time does not exceed the fourteenth threshold (no in S1106), the CPU 102 determines whether the number of write commands stored in the low priority write command storage 110 exceeds a fifteenth threshold (S1109).

When the number of write commands stored in the low priority write command storage 110 exceeds the fifteenth threshold (yes in S1109), the CPU 102 selects the circuit to process the write command from the high priority write circuit 107 and the normal priority write circuit 108 (S1107).

The CPU 102 sends the write command to the selected circuit (S1108). Then, the CPU 102 ends the write command control process (end).

When the number of write commands stored in the low priority write command storage 110 does not exceed the fifteenth threshold (no in S1109), the CPU 102 ends the write command control process (end).

In the write command control process, the CPU 102 executes a process according to the priority group to which an NVM set of the write command target belongs. Specifically, when an NVM set on which the write command targets belongs to the high priority group or the normal priority group, the CPU 102 causes the corresponding dedicated write circuit (that is, the high priority write circuit 107 or the normal priority write circuit 108) to process the write command. As a result, the CPU 102 can guarantee the predictable latency in the write access to the NVM sets belonging to the high priority group and the normal priority group.

Also, when the NVM set on which the write command targets belongs to the low priority group, the CPU 102 suspends the write command. The CPU 102 causes the high priority write circuit 107 or the normal priority write circuit 108 to process the suspended write command at specific timing. Therefore, there is a possibility that the CPU 102 cannot guarantee the predictable latency in the write access to the NVM set that belongs to the low priority group.

As described above, according to the present embodiment, the resources included in the storage device 3 to guarantee the predictable latency can be reduced. The controller 4 manages NVM sets each including at least one of memory areas obtained by logically dividing a memory area of the nonvolatile memory 5. The controller 4 includes the high priority read circuit 105, the high priority write circuit 107, the normal priority read circuit 106, and the normal priority write circuit 108. The high priority read circuit 105 processes a read request (for example, a read command) from the host 2 to first NVM sets belonging to the high priority group. The high priority write circuit 107 processes a write request (for example, a write command) from the host 2 to the first NVM sets. The normal priority read circuit 106 processes a read request from the host 2 to second NVM sets belonging to the normal priority group. The normal priority write circuit 108 processes a write request from the host 2 to the second NVM sets. The controller 4 allocates the high priority read resource 511 and the high priority write resource 513 to the high priority group. The controller 4 allocates the normal priority read resource 512 and the normal priority write resource 514 to the normal priority group. The high priority read circuit 105 reads data from the first NVM sets by using the high priority read resource 511. The high priority write circuit 107 writes data into the first NVM sets by using the high priority write resource 513. The normal priority read circuit 106 reads data from the second NVM sets by using the normal priority read resource 512. The normal priority write circuit writes data into the second NVM sets by using the normal priority write resource 514.

In this way, the controller 4 manages multiple NVM sets with multiple priority groups. Then, the controller 4 allocates a read resource and a write resource to each of the priority groups.

A read request received from the host 2 is processed by a read circuit. The read circuit corresponds to the priority group to which the NVM set of the read request target belongs. The read circuit uses the read resource allocated to the priority group to which the NVM set of the read request target belongs to process the read request.

Further, a write request received from the host 2 is processed by a write circuit. The write circuit corresponds to the priority group to which the NVM set of the write request target belongs. The write circuit uses the write resource allocated to the priority group to which the NVM set of the write request target belongs to process the write request.

As described above, the storage device 3 of the present embodiment includes the read circuit and the write circuit for each priority group, and allocates the resources to the priority group. For this reason, the storage device 3 of the present embodiment can reduce the resources provided for guaranteeing the predictable latency, compared with a case where a dedicated read circuit and a dedicated write circuit, and a dedicated read resource and a dedicated write resource are provided for each NVM set, for example.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In particular, the controller may use DRAM implemented in the host 2 instead of the DRAM 6 to achieve each function described above. Further, the controller may use resources of the host 2 instead of the resource 51 to achieve each function described above.

What is claimed is:

1. A storage device comprising:
   a nonvolatile memory; and
   a controller connected to the nonvolatile memory and configured to:
      logically divide a memory area of the nonvolatile memory into at least a first plurality of memory areas, a second plurality of memory areas, and a third plurality of memory areas;
      manage a plurality of memory area sets including at least a first memory area set, a second memory area set, and a third memory area set, the first memory area set including the first plurality of memory areas, the second memory area set including the second plurality of memory areas, the third memory area set including the third plurality of memory areas;
      distribute the first memory area set into a first group;
      distribute the second memory area set into a second group that is different from the first group;
      distribute the third memory area set into a third group that is different from the first and second groups;
      transition an operation period on each of the first, second, and third memory area sets from a first period to a second period, the first period being a period in which predictable latency is required to be guaranteed, the second period being a period in which the predictable latency is not required to be guaranteed;

redistribute, in response to the operation period on the first memory area set or the second memory area set transitioning from the first period to the second period, the first memory area set or the second memory area set into the third group; and redistribute, in response to the operation period on the third memory area set transitioning from the second period to the first period, the third memory area set into the first group or the second group.

2. The storage device according to claim 1, further comprising a volatile memory, wherein the controller is further configured to:

allocate a first part of a memory area of the volatile memory to the first group as a first resource;

allocate a second part of the memory area of the volatile memory to the first group as a second resource;

allocate a third part of the memory area of the volatile memory to the second group as a third resource; and allocate a fourth part of the memory area of the volatile memory to the second group as a fourth resource, wherein the controller comprises:

a first circuit configured to process, by using the first resource, a first read request from a host to the first memory area set distributed into the first group;

a second circuit configured to process, by using the second resource, a first write request from the host to the first memory area set distributed into the first group;

a third circuit configured to process, by using the third resource, a second read request from the host to the second memory area set distributed into the second group; and a fourth circuit configured to process, by using the fourth resource, a second write request from the host to the second memory area set distributed into the second group.

3. The storage device according to claim 1, wherein the controller is further configured to suspend a process of at least one of a read request or a write request from a host to the third memory area set distributed into the third group.

4. The storage device according to claim 1, wherein the controller is further configured to:

transmit, in response to receiving a first read request from a host to the first memory area set distributed into the first group, a response to the first read request within a first time period;

transmit, in response to receiving a first write request from the host to the first memory area set distributed into the first group, a response to the first write request within the first time period;

transmit, in response to receiving a second read request from the host to the second memory area set distributed into the second group, a response to the second read request within a second time period longer than the first time period; and transmit, in response to receiving a second write request from the host to the second memory area set distributed into the second group, a response to the second write request within the second time period.

5. The storage device according to claim 1, wherein the controller is further configured to:

transmit, in response to receiving a first read request from a host to the first memory area set distributed into the first group, a response to the first read request by spending a first time period;

transmit, in response to receiving a first write request from the host to the first memory area set distributed into the first group, a response to the first write request by spending the first time period;

transmit, in response to receiving a second read request from the host to the second memory area set distributed into the second group, a response to the second read request by spending a second time period longer than the first time period; and transmit, in response to receiving a second write request from the host to the second memory area set distributed into the second group, a response to the second write request by spending the second time period.

6. The storage device according to claim 2, wherein the controller is further configured to:

redistribute the first memory area set from the first group into the second group in response to a ratio of a size of data processed by the first circuit to an upper limit of a size of data that the first circuit is capable of processing using the first resource being larger than a first threshold, or in response to an amount of change per unit time in a size of data processed by the first circuit being larger than a second threshold;

redistribute the first memory area set from the first group into the second group in response to a ratio of a size of data processed by the second circuit to an upper limit of a size of data that the second circuit is capable of processing using the second resource being larger than a third threshold, or in response to an amount of change per unit time in a size of data processed by the second circuit being larger than a fourth threshold;

redistribute the second memory area set from the second group into the first group in response to a ratio of a size of data processed by the third circuit to an upper limit of a size of data that the third circuit is capable of processing using the third resource being larger than a fifth threshold, or in response to an amount of change per unit time in a size of data processed by the third circuit being larger than a sixth threshold; and redistribute the second memory area set from the second group into the first group in response to a ratio of a size of data processed by the fourth circuit to a size of data that the fourth circuit is capable of processing using the fourth resource being larger than a seventh threshold, or in response to an amount of change per unit time in a size of data processed by the fourth circuit being larger than an eighth threshold.

7. The storage device according to claim 2, wherein the controller is further configured to:

reallocate at least a part of the third part which has been allocated to the second group as the third resource, to the first group as the first resource in response to a ratio of a size of data processed by the first circuit to an upper limit of a size of data that the first circuit is capable of processing using the first resource being larger than a first threshold, or in response to an amount of change per unit time in a size of data processed by the first circuit being larger than a second threshold;

reallocate at least a part of the fourth part which has been allocated to the second group as the fourth resource, to the first group as the second resource in response to a ratio of a size of data processed by the second circuit to an upper limit of a size of data that the second circuit is capable of processing using the second resource being larger than a third threshold, or in response to an amount of change per unit time in a size of data processed by the second circuit being larger than a fourth threshold;

reallocate at least a part of the first part which has been allocated to the first group as the first resource, to the second group as the third resource in response to a ratio of a size of data processed by the third circuit to an upper limit of a size of data that the third circuit is capable of processing using the third resource being larger than a fifth threshold, or in response to an amount of change per unit time in a size of data processed by the third circuit being larger than a sixth threshold; and reallocate at least a part of the second part which has been allocated to the first group as the second resource, to the second group as the fourth resource in response to a ratio of a size of data processed by the fourth circuit to an upper limit of a size of data that the fourth circuit is capable of processing using the fourth resource being larger than a seventh threshold, or in response to an amount of change per unit time in a size of data processed by the fourth circuit being larger than an eighth threshold.

8. The storage device according to claim 2, wherein the controller is further configured to allocate a fifth part of the memory area of the volatile memory to the third group as a fifth resource, the fifth part being different from the first to fourth parts, wherein the controller is further configured to:

reallocate at least a part of the fifth resource which has been allocated to the third group, to at least one of the first group as the first resource and the second group as the third resource in response to a ratio of a sum of a size of data processed by the first circuit and a size of data processed by the third circuit to a sum of an upper limit of a size of data that the first circuit is capable of processing using the first resource and an upper limit of a size of data that the third circuit is capable of processing using the third resource being larger than a first threshold; and reallocate at least a part of the fifth resource which has been allocated to the third group, to at least one of the first group as the second resource and the second group as the fourth resource in response to a ratio of a sum of a size of data processed by the second circuit and a size of data processed by the fourth circuit to a sum of an upper limit of a size of data that the second circuit is capable of processing using the second resource and an upper limit of a size of data that the fourth circuit is capable of processing using the fourth resource being larger than a second threshold.

9. The storage device according to claim 2, wherein the plurality of memory area sets further include a fourth memory area set and a fifth memory area set, the first circuit is further configured to process data on the fourth memory area set, the second circuit is further configured to process data on the fourth memory area set, the third circuit is further configured to process data on the fifth memory area set, and the fourth circuit is further configured to process data on the fifth memory area set, wherein the controller is further configured to:

distribute the fourth memory area set into the first group;

redistribute the first memory area set into the third group in response to a size of the data processed by the first circuit on the fourth memory area set being larger than a first threshold;

redistribute the first memory area set into the third group in response to a size of the data processed by the second circuit on the fourth memory area set being larger than a second threshold;

distribute the fifth memory area set into the second group;

redistribute the second memory area set into the third group in response to a size of the data processed by the third circuit on the fifth memory area set being larger than a third threshold; and redistribute the second memory area set into the third group in response to a size of the data processed by the fourth circuit on the fifth memory area set being larger than a fourth threshold.

10. The storage device according to claim 1, wherein the controller is further configured to transition an operation period on at least one of memory area sets distributed in the third group from the second period to the first period in response to the number of memory area sets distributed in the first group and the second group being less than a first threshold.

11. The storage device according to claim 2, wherein the controller is further configured to:

allocate a fifth part of the memory area of the volatile memory to the third group as a fifth resource; and perform a maintenance process on the third memory area set using the fifth resource.

12. The storage device according to claim 11, wherein the controller is further configured to:

calculate an amount of a resource for completing the maintenance process within the second period; and in response to an amount of the fifth resource being smaller than the calculated amount of the resource, reallocate part of the first resource, the second resource, the third resource, and the fourth resource to the third group as the fifth resource.

13. A control method of a storage device, the storage device including a nonvolatile memory, the control method comprising:

logically dividing a memory area of the nonvolatile memory into at least a first plurality of memory areas, a second plurality of memory areas, and a third plurality of memory areas;

managing a plurality of memory area sets including at least a first memory area set, a second memory area set, and a third memory area set, the first memory area set including the first plurality of memory areas, the second memory area set including the second plurality of memory areas, the third memory area set including the third plurality of memory areas;

distributing the first memory area set into a first group;

distributing the second memory area set into a second group that is different from the first group;

distributing the third memory area set into a third group that is different from the first and second groups;

transitioning an operation period on each of the first, second, and third memory area sets from a first period to a second period, the first period being a period in which predictable latency is required to be guaranteed, the second period being a period in which the predictable latency is not required to be guaranteed;

redistributing, in response to the operation period on the first memory area set or the second memory area set transitioning from the first period to the second period, the first memory area set or the second memory area set into the third group; and redistributing, in response to the operation period on the third memory area set transitioning from the second period to the first period, the third memory area set into the first group or the second group.

14. The control method according to claim 13, wherein the storage device further includes a first circuit, a second circuit, a third circuit, a fourth circuit, and a volatile memory, wherein the control method further comprises:
   allocating a first part of a memory area of the volatile memory to the first group as a first resource;
   allocating a second part of the memory area of the volatile memory to the first group as a second resource;
   allocating a third part of the memory area of the volatile memory to the second group as a third resource;
   allocating a fourth part of the memory area of the volatile memory to the second group as a fourth resource;
   using, by the first circuit, the first resource to process a first read request from a host to the first memory area set distributed into the first group;
   using, by the second circuit, the second resource to process a first write request from the host to the first memory area set distributed into the first group;
   using, by the third circuit, the third resource to process a second read request from the host to the second memory area set distributed into the second group; and
   using, by the fourth circuit, the fourth resource to process a second write request from the host to the second memory area set distributed into the second group.

15. The control method according to claim 13, further comprising:
   suspending a process of at least one of a read request or a write request from a host to the third memory area set distributed into the third group.

16. The control method according to claim 13, further comprising:
   transmitting, in response to receiving a first read request from a host to the first memory area set distributed into the first group, a response to the first read request within a first time period;
   transmitting, in response to receiving a first write request from the host to the first memory area set distributed into the first group, a response to the first write request within the first time period;
   transmitting, in response to receiving a second read request from the host to the second memory area set distributed into the second group, a response to the second read request within a second time period longer than the first time period; and
   transmitting, in response to receiving a second write request from the host to the second memory area set distributed into the second group, a response to the second write request within the second time period.

17. The control method according to claim 14, further comprising:
   redistributing the first memory area set from the first group into the second group in response to a ratio of a size of data processed by the first circuit to an upper limit of a size of data that the first circuit is capable of processing using the first resource being larger than a first threshold, or in response to an amount of change per unit time in a size of data processed by the first circuit being larger than a second threshold;
   redistributing the first memory area set from the first group into the second group in response to a ratio of a size of data processed by the second circuit to an upper limit of a size of data that the second circuit is capable of processing using the second resource being larger than a third threshold, or in response to an amount of change per unit time in a size of data processed by the second circuit being larger than a fourth threshold;
   redistributing the second memory area set from the second group into the first group in response to a ratio of a size of data processed by the third circuit to an upper limit of a size of data that the third circuit is capable of processing using the third resource being larger than a fifth threshold, or in response to an amount of change per unit time in a size of data processed by the third circuit being larger than a sixth threshold; and
   redistributing the second memory area set from the second group into the first group in response to a ratio of a size of data processed by the fourth circuit to a size of data that the fourth circuit is capable of processing using the fourth resource being larger than a seventh threshold, or in response to an amount of change per unit time in a size of data processed by the fourth circuit being larger than an eighth threshold.

18. The control method according to claim 14, further comprising:
   reallocating at least a part of the third part which has been allocated to the second group as the third resource, to the first group as the first resource in response to a ratio of a size of data processed by the first circuit to an upper limit of a size of data that the first circuit is capable of processing using the first resource being larger than a first threshold, or in response to an amount of change per unit time in a size of data processed by the first circuit being larger than a second threshold;
   reallocating at least a part of the fourth part which has been allocated to the second group as the fourth resource, to the first group as the second resource in response to a ratio of a size of data processed by the second circuit to an upper limit of a size of data that the second circuit is capable of processing using the second resource being larger than a third threshold, or in response to an amount of change per unit time in a size of data processed by the second circuit being larger than a fourth threshold;
   reallocating at least a part of the first part which has been allocated to the first group as the first resource, to the second group as the third resource in response to a ratio of a size of data processed by the third circuit to an upper limit of a size of data that the third circuit is capable of processing using the third resource being larger than a fifth threshold, or in response to an amount of change per unit time in a size of data processed by the third circuit being larger than a sixth threshold; and reallocating at least a part of the second part which has been allocated to the first group as the second resource, to the second group as the fourth resource in response to a ratio of a size of data processed by the fourth circuit to an upper limit of a size of data that the fourth circuit is capable of processing using the fourth resource being larger than a seventh threshold, or in response to an amount of change per unit time in a size of data processed by the fourth circuit being larger than an eighth threshold.

\* \* \* \* \*